(12) United States Patent
Bricaud et al.

(10) Patent No.: US 6,169,257 B1
(45) Date of Patent: Jan. 2, 2001

(54) SMART CARD ACTUATED DOME CONTACT SWITCH

(75) Inventors: Herve Guy Bricaud, Dole; Fabrice Valcher, Damparis, both of (FR)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 09/206,644

(22) Filed: Dec. 7, 1998

(30) Foreign Application Priority Data

Dec. 24, 1997 (FR) .................................................. 97 16564

(51) Int. Cl.⁷ .............................. H01H 43/08; H01H 1/10
(52) U.S. Cl. ............................... 200/46; 200/517; 235/441
(58) Field of Search ..................... 200/46, 406, 512–517, 200/51 R, 51.09, 292, 511, 407, 408, 533, 303; 235/441, 486; 439/188

(56) References Cited

U.S. PATENT DOCUMENTS

| | | | |
|---|---|---|---|
| 5,113,047 | * | 5/1992 | Tsutsumi ............................. 200/407 |
| 5,118,912 | * | 6/1992 | Itabashi ............................... 200/534 |
| 5,660,272 | * | 8/1997 | Janniere et al. .................. 200/533 X |
| 5,760,352 | * | 6/1998 | Ishihara et al. .................... 200/520 X |
| 5,775,937 | * | 7/1998 | Bricaud et al. ..................... 200/51 R |
| 5,807,124 | * | 9/1998 | Bricaud et al. ........................ 439/188 |
| 5,854,458 | * | 12/1998 | Ramamurthy et al. ............. 200/61.54 |
| 6,045,049 | * | 4/2000 | Nishimura et al. .................. 235/486 |

FOREIGN PATENT DOCUMENTS 0 474 519 B1   6/1991 (EP) .
WO95/533244  5/1995 (WO) .

* cited by examiner

Primary Examiner—J. R. Scott
(74) Attorney, Agent, or Firm—Thomas L. Peterson

(57) ABSTRACT

A switch assembly (30, FIG. 3) for detecting full insertion of a smart card, is of small thickness and can be mass produced with high precision. The switch assembly includes a molded support (100) forming an upwardly-opening support cavity (114), outer and central contacts (38, 40) mounted on the support and having dome-engaging parts (148, 150) lying in the support cavity, and a tripping dome (36) lying in the support cavity with a center portion lying over the dome-engaging part of the central contact. A cover (32) receives the support in a downward-opening cover cavity (65), and holds an actuating device (42) that can depress the tripping dome to close the switch. The actuating device is of sheet metal, with a heel (67) that is fixed in the rear end of the cover cavity, with a second part (82) substantially engaged with the center portion of the tripping dome, and with a front end forming an actuating lever (88) that extends through an opening (52) in the cover to be depressed by a smart card. The contacts have intermediate portions lying in a common plane and embedded in the support, with the dome-engaging part of the central contact being downwardly bent.

15 Claims, 21 Drawing Sheets

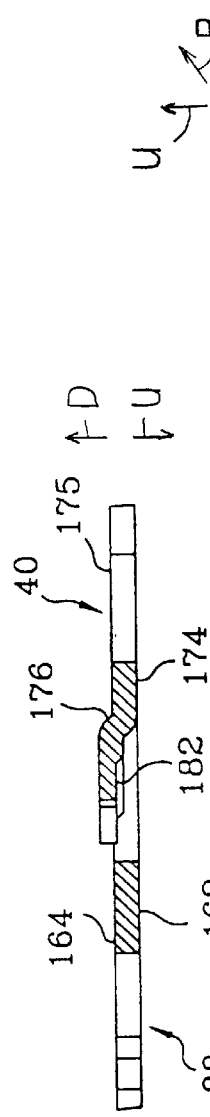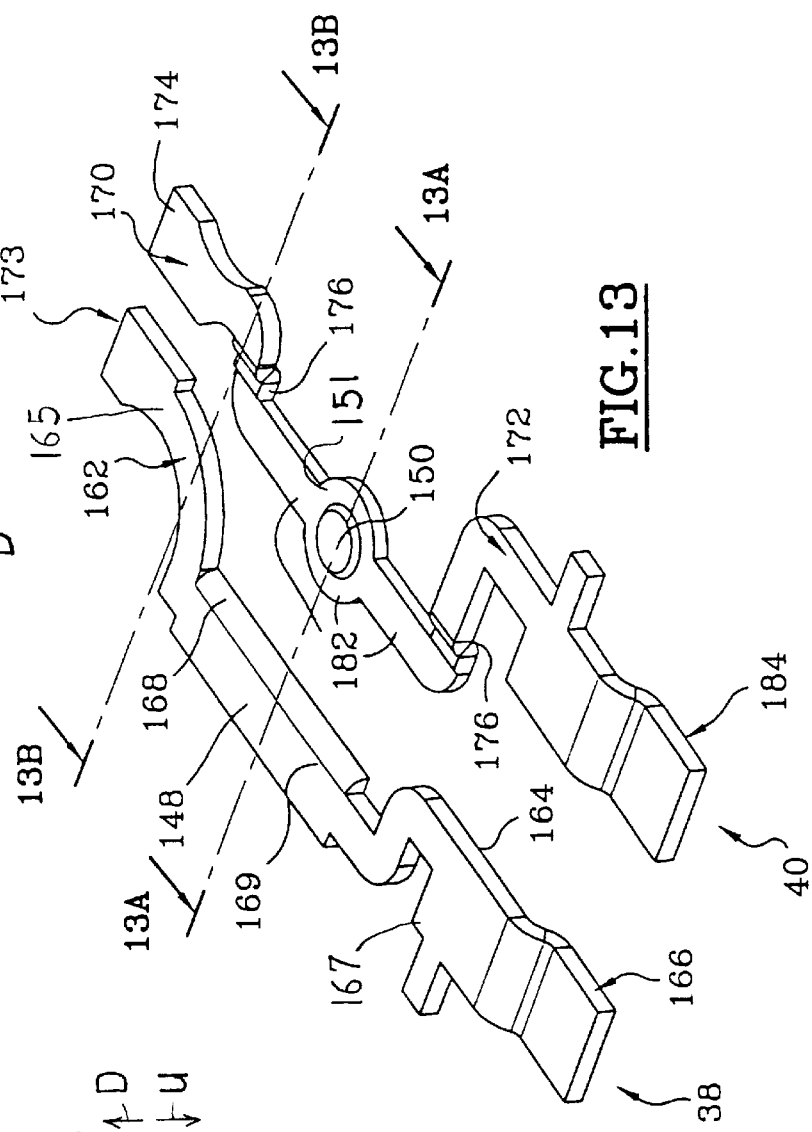
FIG. 13
FIG. 13A
FIG. 13B

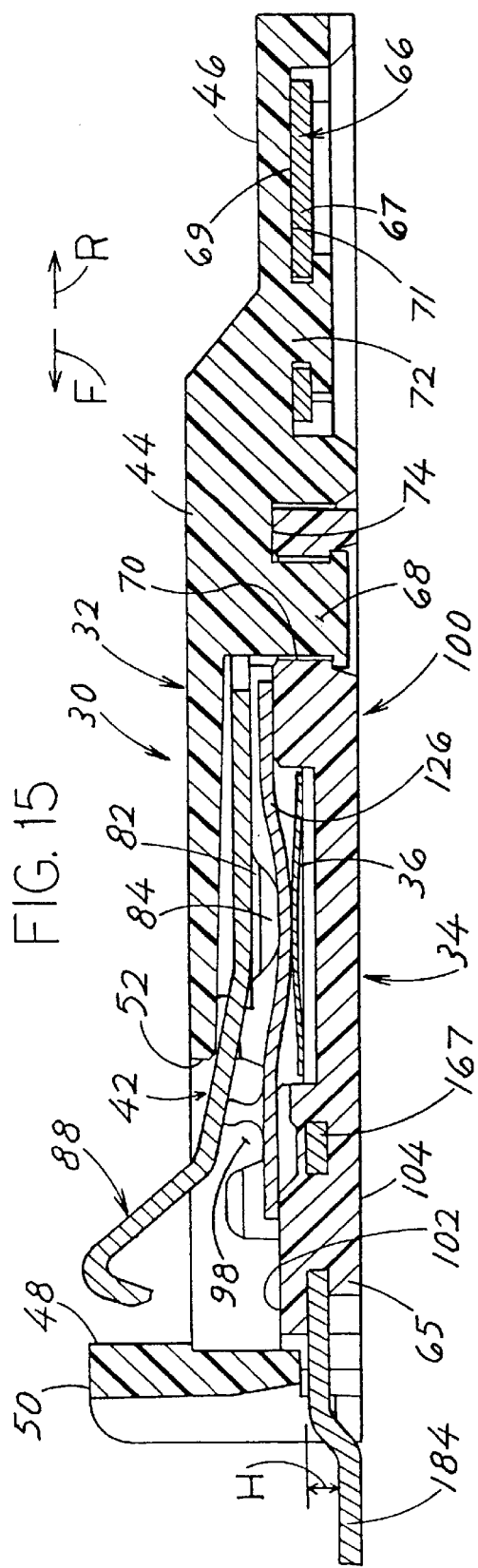
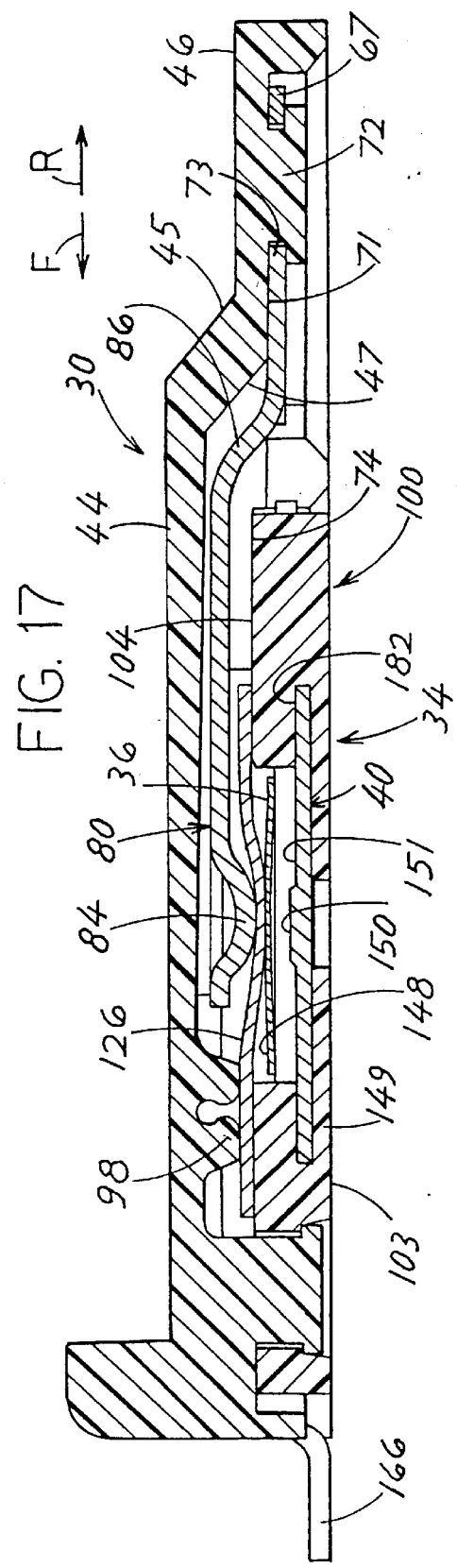

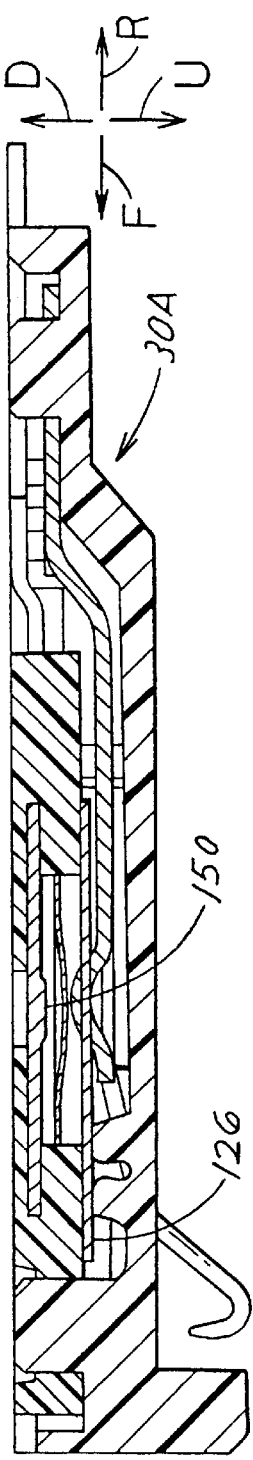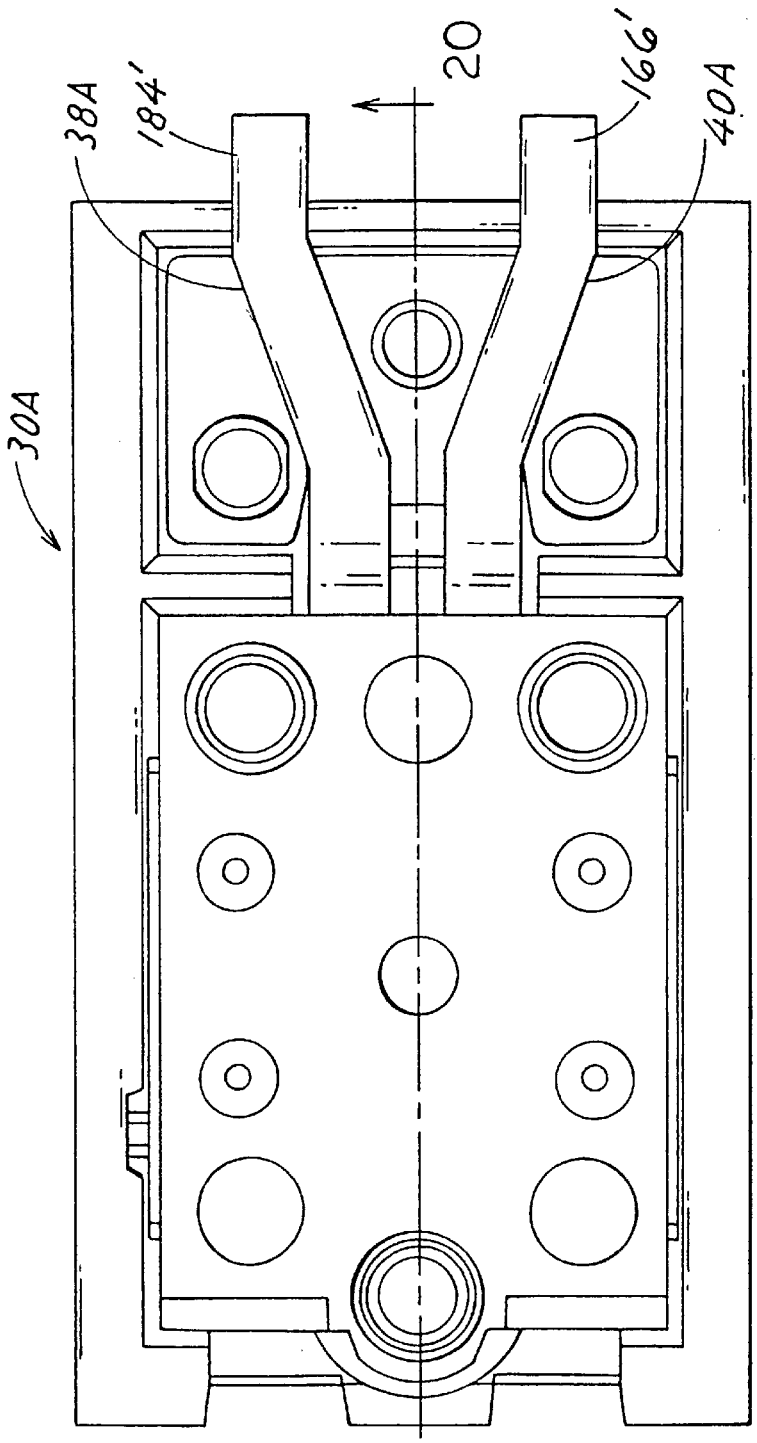

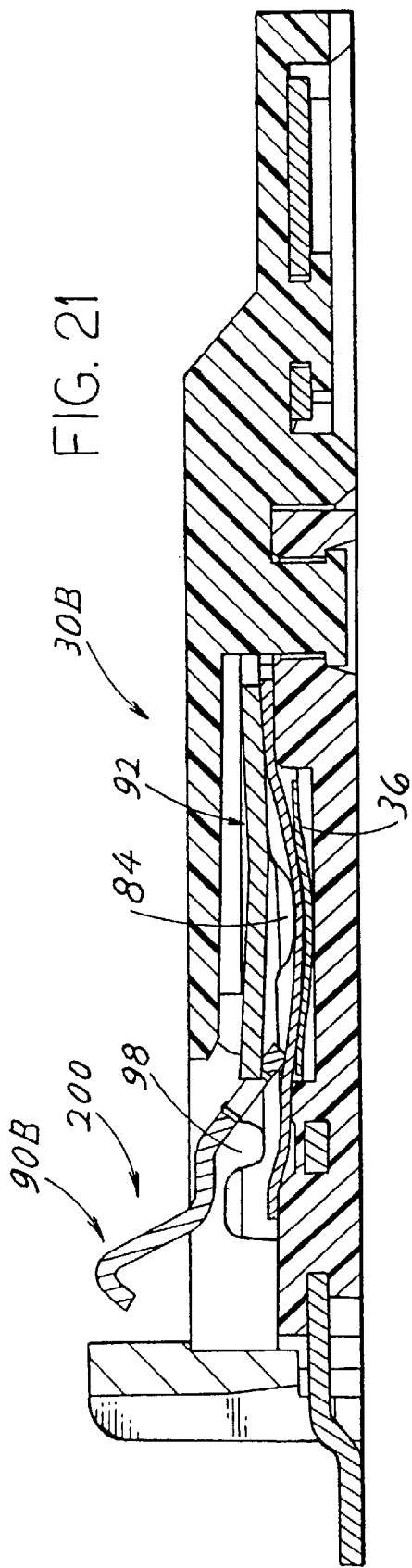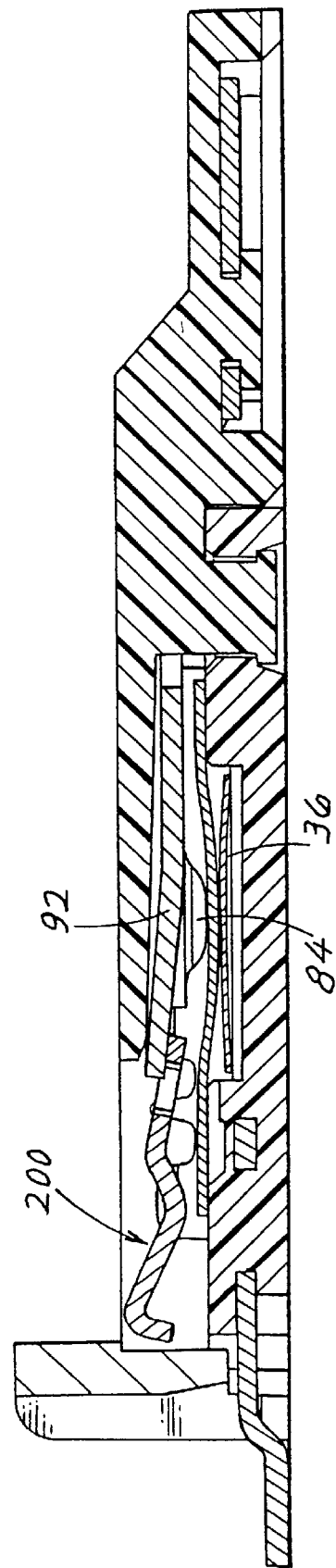

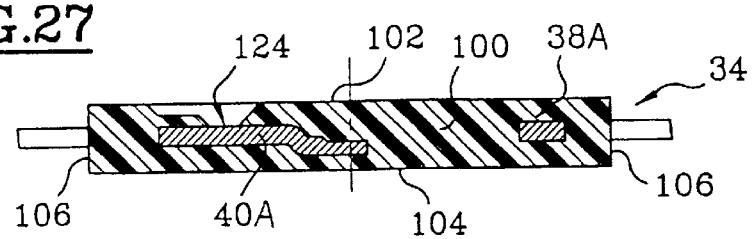
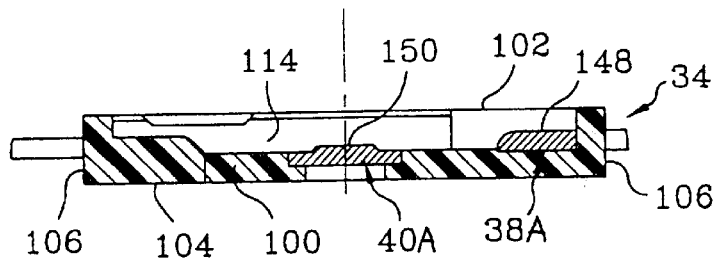
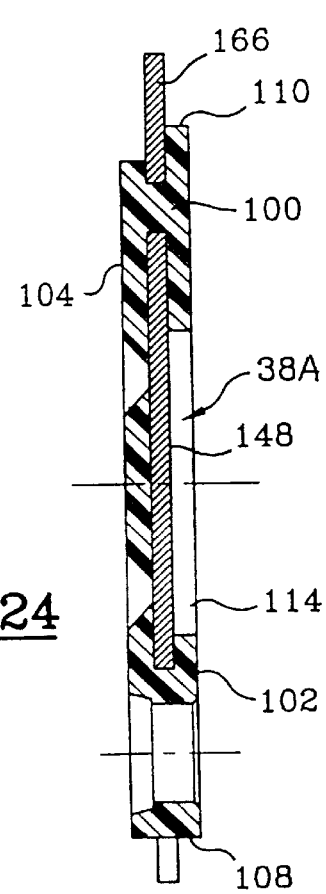
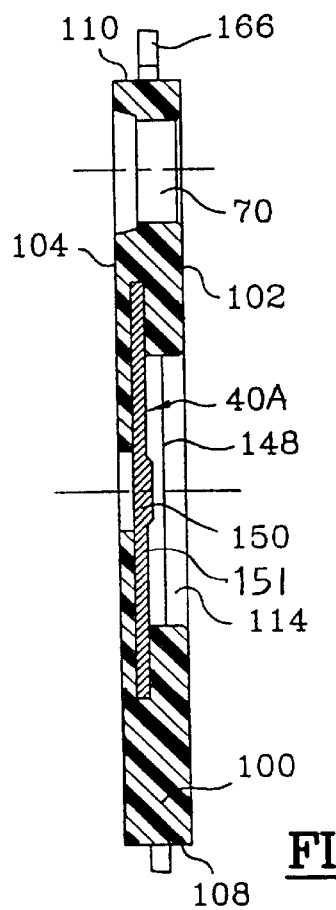

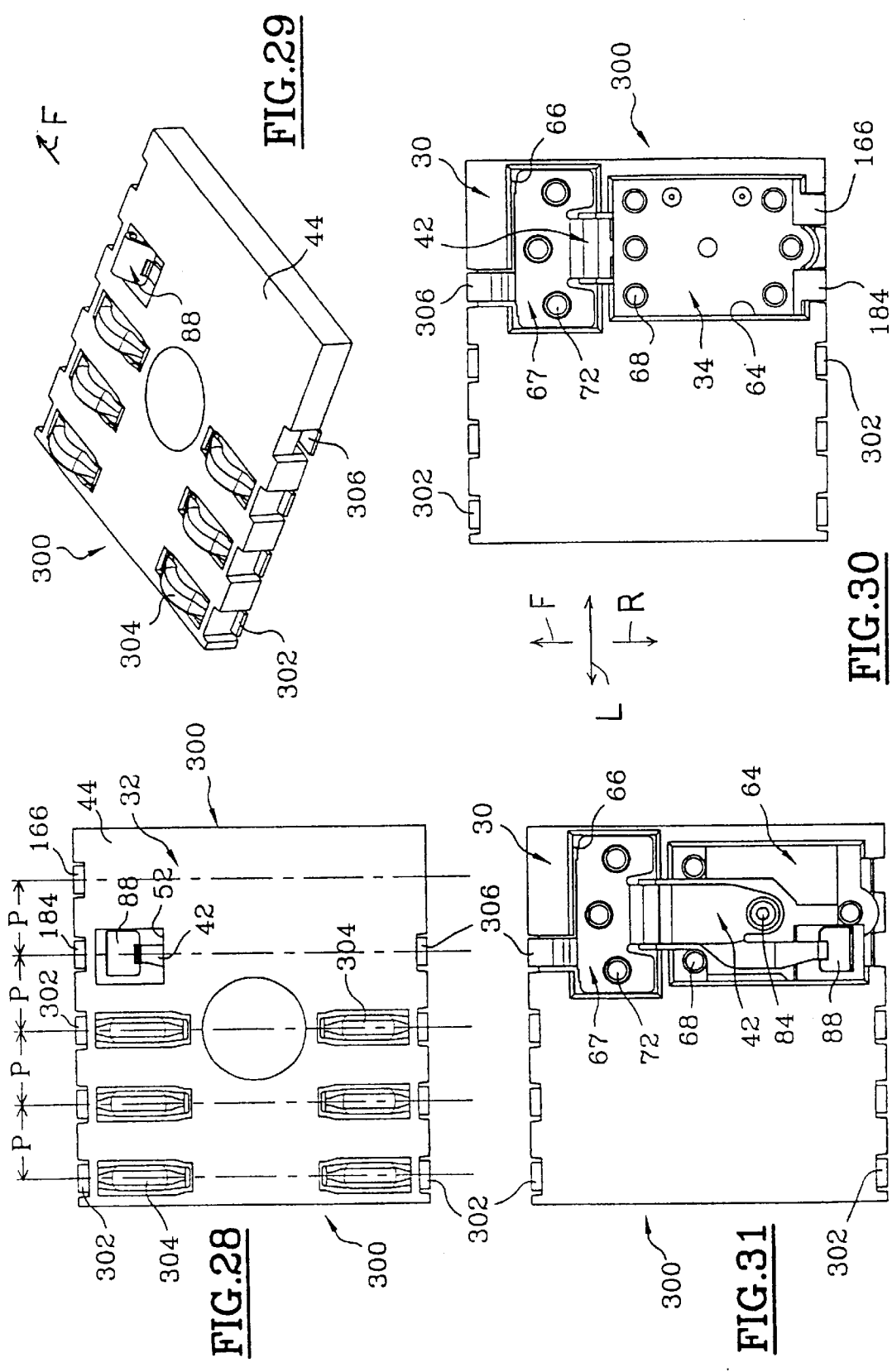

SMART CARD ACTUATED DOME CONTACT SWITCH

BACKGROUND OF THE INVENTION

The present invention relates to an electrical switch assembly that can be built into a connector that connects to pads of a smart card, the present switch detecting the presence of a smart card in its fully inserted position. The object of the invention is to provide a switch whose height is less than that of the present state of the art, and which has very high switching reliability when made in mass production.

SUMMARY OF THE INVENTION

In accordance with one embodiment of the present invention, a switch assembly is provided that is rugged, of high reliability in mass production, and of very small thickness. The switch assembly includes a molded support of insulative material with an upwardly-opening support cavity. Outer and central contacts are mounted on the support and have dome-engaging parts lying in the support cavity. A dome-like tripping device, or tripping dome, lies in the cavity, with a periphery lying on the dome-engaging part of the outer contact and with a center portion lying over the dome-engaging part of the central contact. A cover has an upper face on which a card can slide, and a downwardly-opening cover cavity which receives the support. An actuating device comprises a piece of sheet metal having a heel that lies in a rear portion of the cover cavity when it is fixed to the cover. The actuating device has a second part substantially engaged with the center portion of the tripping device to depress it and thereby operate the switch, and has an actuating lever that extends through an opening in the cover and above the upper face of the cover.

The outer and central contacts are formed of strips of sheet metal with intermediate portions embedded in the molded support and lying coplanar, with the dome-engaging parts lying forward of the intermediate portions and with connection ends for soldering to traces on a circuit board. The dome-engaging part of the central contact is bent downwardly to lie below the plane of the intermediate portions and below the dome-engaging part of the outer contact.

The support and the heel of the actuating device lie in different cavity parts at the bottom of the cover, and they are both fixed in place by studs of the cover that project through holes in the support and in the heel of the actuating device. A film that covers the tripping dome, is wrapped about the sides of the molded support.

The novel features of the invention are set forth with particularity in the appended claims. The invention will be best understood from the following description when read in conjunction with the accompanying drawings.

BRIEF DESCRIPTION OF THE DRAWINGS

FIG. 13 is an isometric front and top view showing the two contacts of the switch unit of FIG. 11.

FIG. 13A is a sectional view taken on line 13A—13A of FIG. 13, showing the contacts in an upside-down orientation.

FIG. 13B is a sectional view taken on line 13B—13B of FIG. 13, showing the contacts in an upside-down orientation.

FIG. 15 is sectional view of the switch assembly of FIG. 1, taken on line 15—15 thereof, with the switch in an untripped position.

FIG. 17 is a sectional view of the switch assembly of FIG. 1, taken on line 17—17 thereof, with the switch in an untripped position.

FIG. 19 is a bottom view of a switch of another embodiment of the invention, which differs from the embodiment of FIGS. 1–18 by the orientation of its output or connection tabs.

FIG. 20 is a sectional view taken on line 20—20 of FIG. 19.

FIGS. 21 and 22 are sectional views of a switch of another embodiment of the invention, where the switch is normally closed in the untripped position and open in the tripped position, with FIG. 21 showing the switch in its untripped position and FIG. 22 showing the switch in its tripped position.

FIGS. 24–27 are sectional views taken on the lines 24—24 to 27—27, respectively, of FIG. 23.

FIG. 28 is a top view of a switch assembly of the present invention, shown built into a very compact connector which can engage contact pads of a smart card.

FIG. 29 is an isometric view of the connector of FIG. 28.

FIG. 30 is a bottom view of the connector of FIG. 28.

FIG. 31 is a bottom view of the connector of FIG. 30, in which the switch unit has been removed.

DESCRIPTION OF THE PREFERRED EMBODIMENTS

Figure 1:
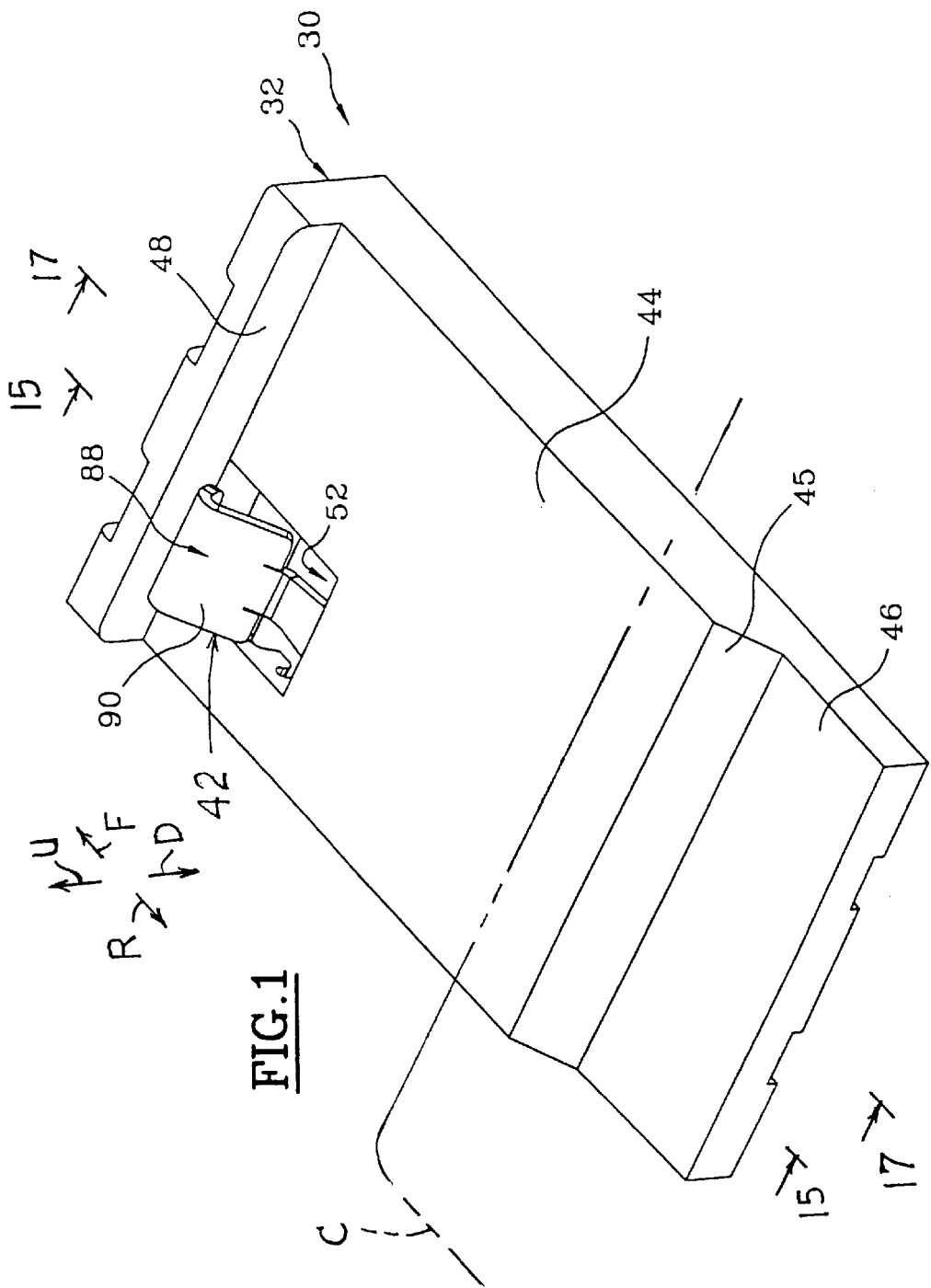
FIG. 1 is an isometric rear and top view of a switch assembly of one embodiment of the invention.

FIG. 1 illustrates a switch assembly 30 for detecting the full insertion of a smart card, indicated at C, which may be slid in a forward direction F along or slightly above the upper face 44 of the switch assembly until the card abuts a stop surface 48 of the switch assembly. As the card approaches its fully inserted position, it depresses a ramp 90 of a pedal or lever 88 of an actuating device or actuator 42, which trips a switch to indicate to a read/write circuit (not shown) that the card has been fully inserted. This type of switch is shown in U.S. Pat. No. 5,807,124. The present switch assembly 30 is constructed to have a very small height in up and down directions U, D, in a rugged design that locates its parts with precision to assure that when the lever 88 is depressed, the switch will be reliably tripped.

Figure 3:
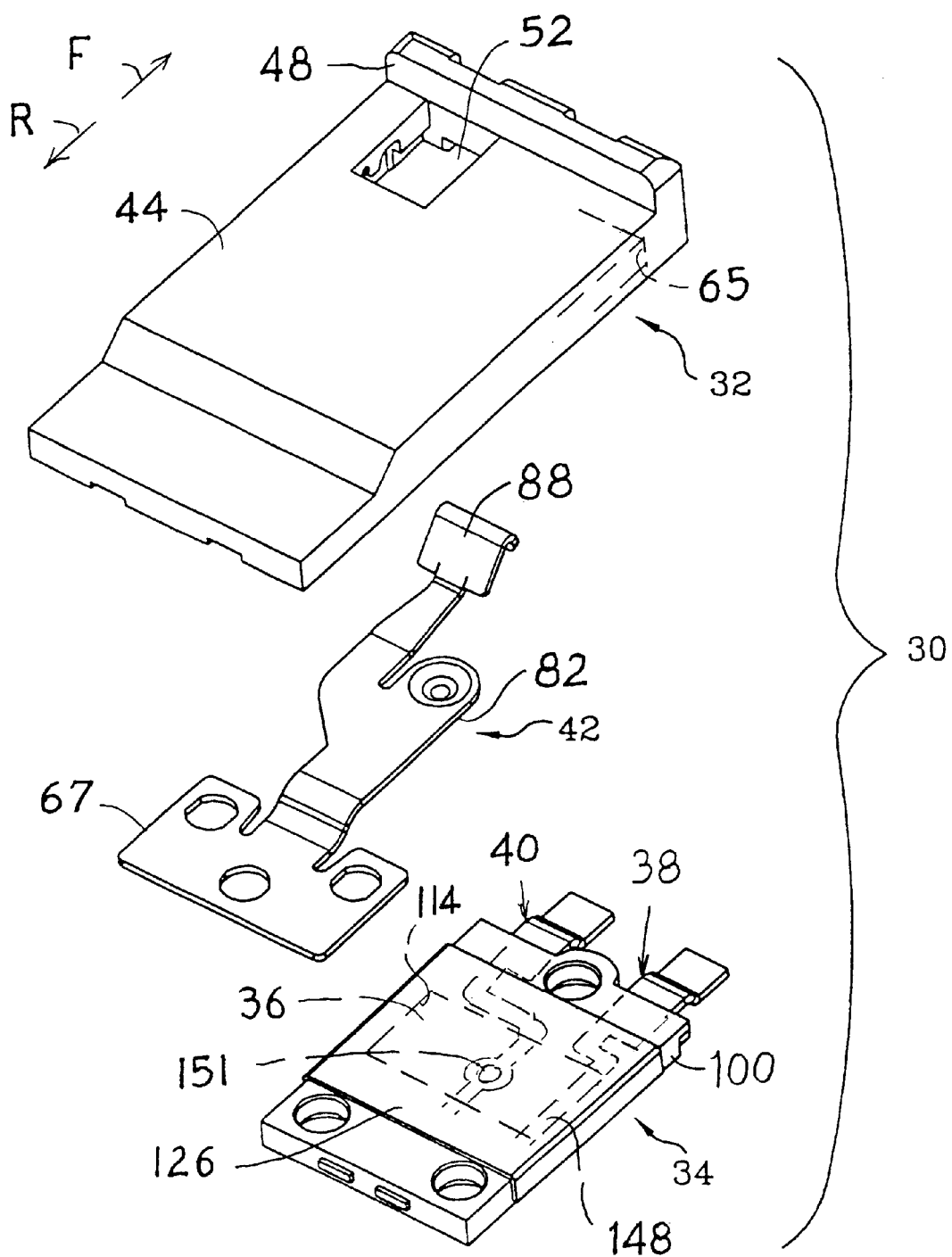
FIG. 3 is an exploded isometric rear and top view of three main components of the switch assembly of FIG. 1.
Figure 4:
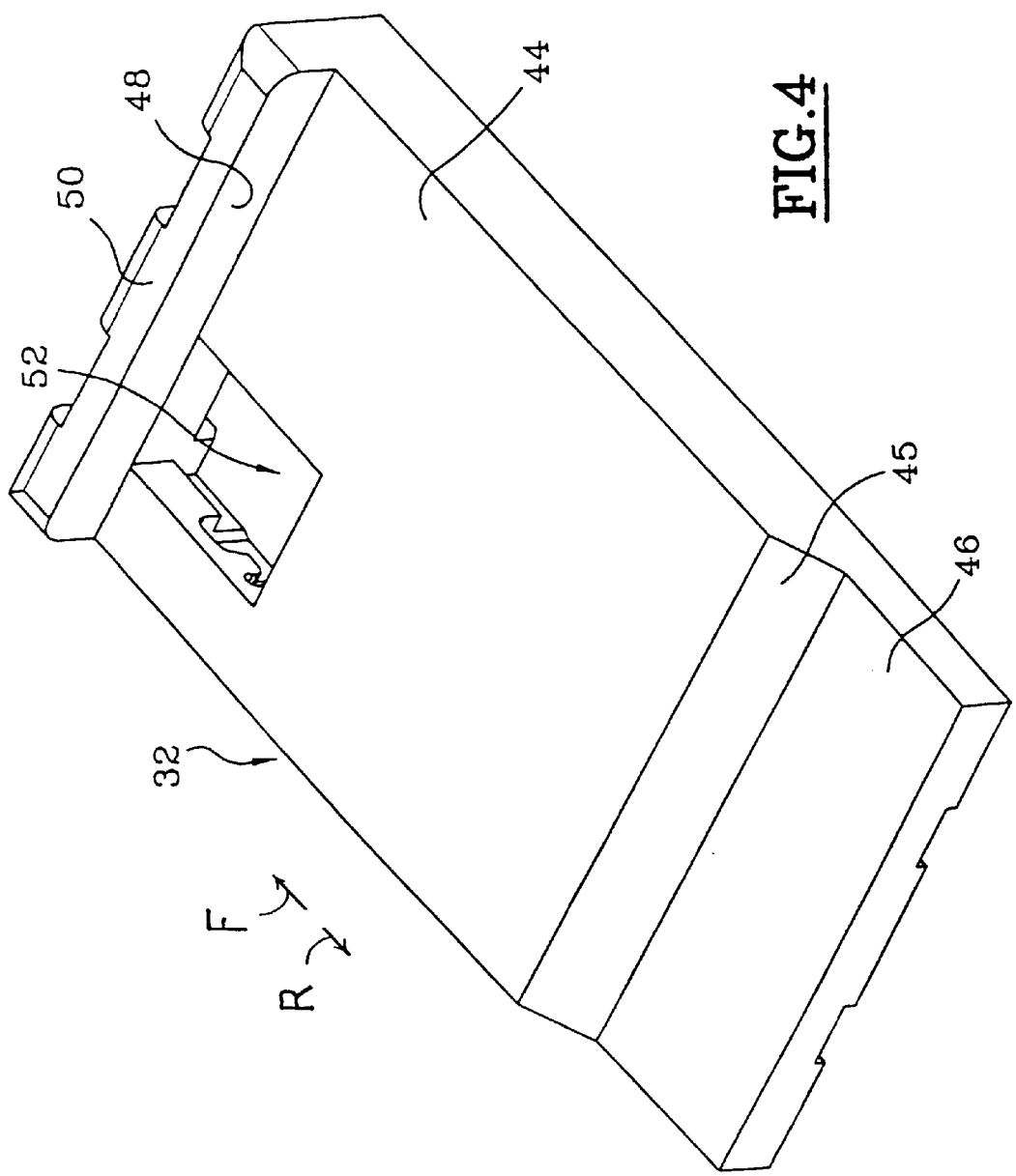
FIG. 4 is an isometric rear and top view of the cover of the switch assembly of FIG. 1.

FIG. 3 shows the components of the switch assembly 30, which includes a molded insulative cover 32 that has a downwardly-opening cavity 65. The actuator 42 has a rear end forming a heel 67 that lies in a rear end of the cover cavity, a second part 82, and the actuating lever 88. A lower switch unit 34 which is received in the front portion of the cover cavity, includes a molded support 100 of insulating material, center and outer contacts 40, 38, a tripping device or tripping dome 36, and a film 126 that covers the tripping dome 36 and dome-engaging parts 148, 151 of the contacts. It is noted that while a cover 32 of small width and length are shown, the cover 32 can be part of a larger housing that holds terminals that engage contact pads of a smart card. The term "tripping dome" does not refer to the geometric shape of the device 36, but to the fact that it operates in a manner similar to a common rounded deflectable dome used in switches.

Figure 11:
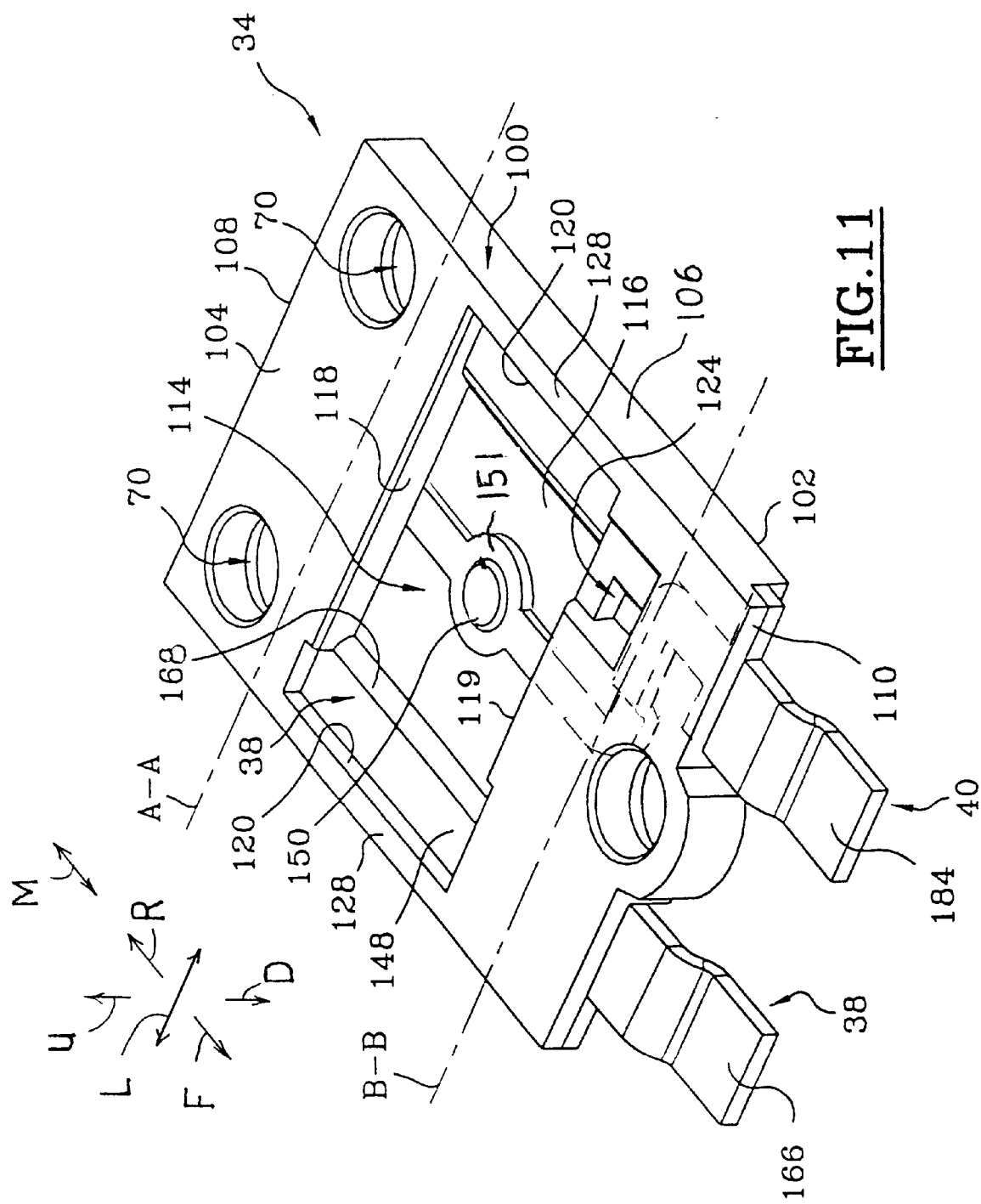
FIG. 11 is a view similar to that of FIG. 10, in which the tripping device has been removed.
Figure 12:
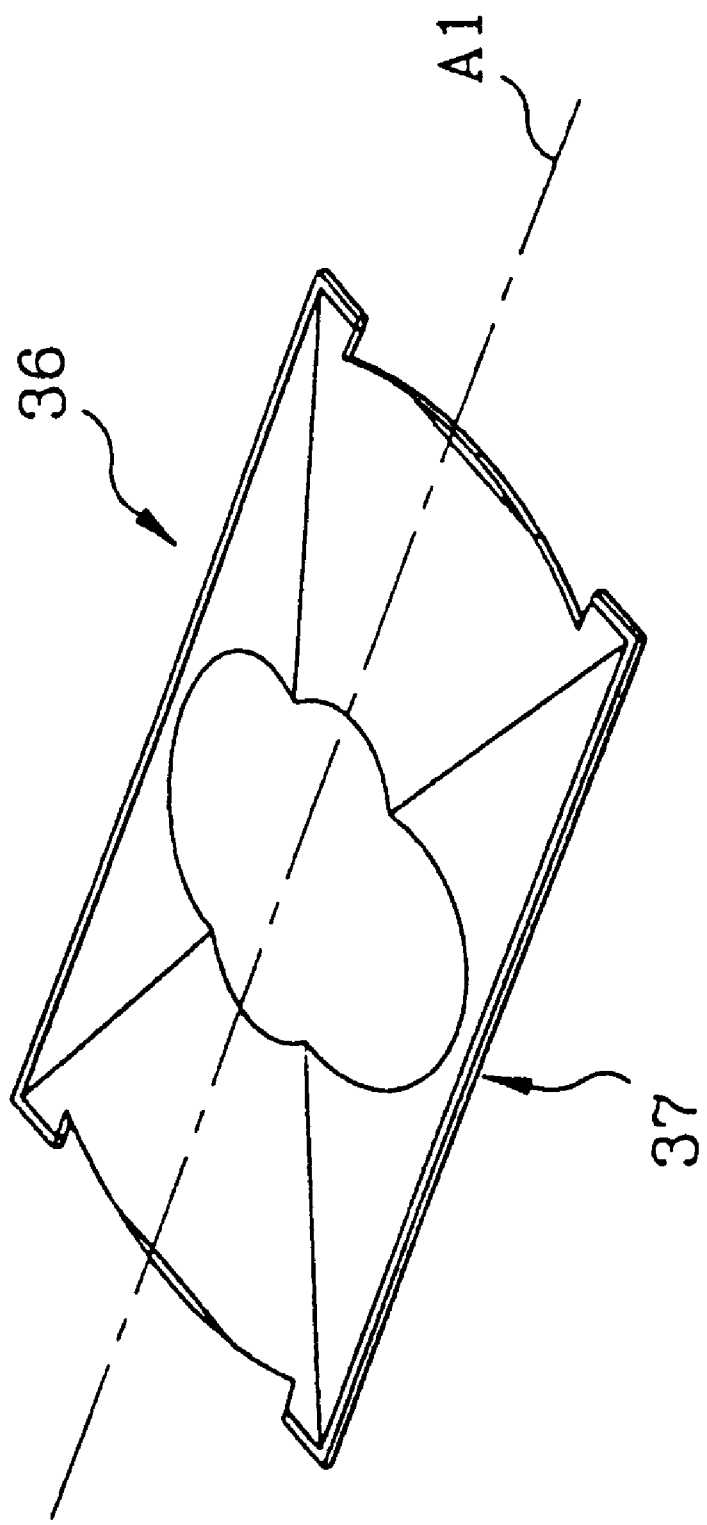
FIG. 12 is an isometric top view of the tripping device of the switch unit of FIG. 10.
Figure 14:
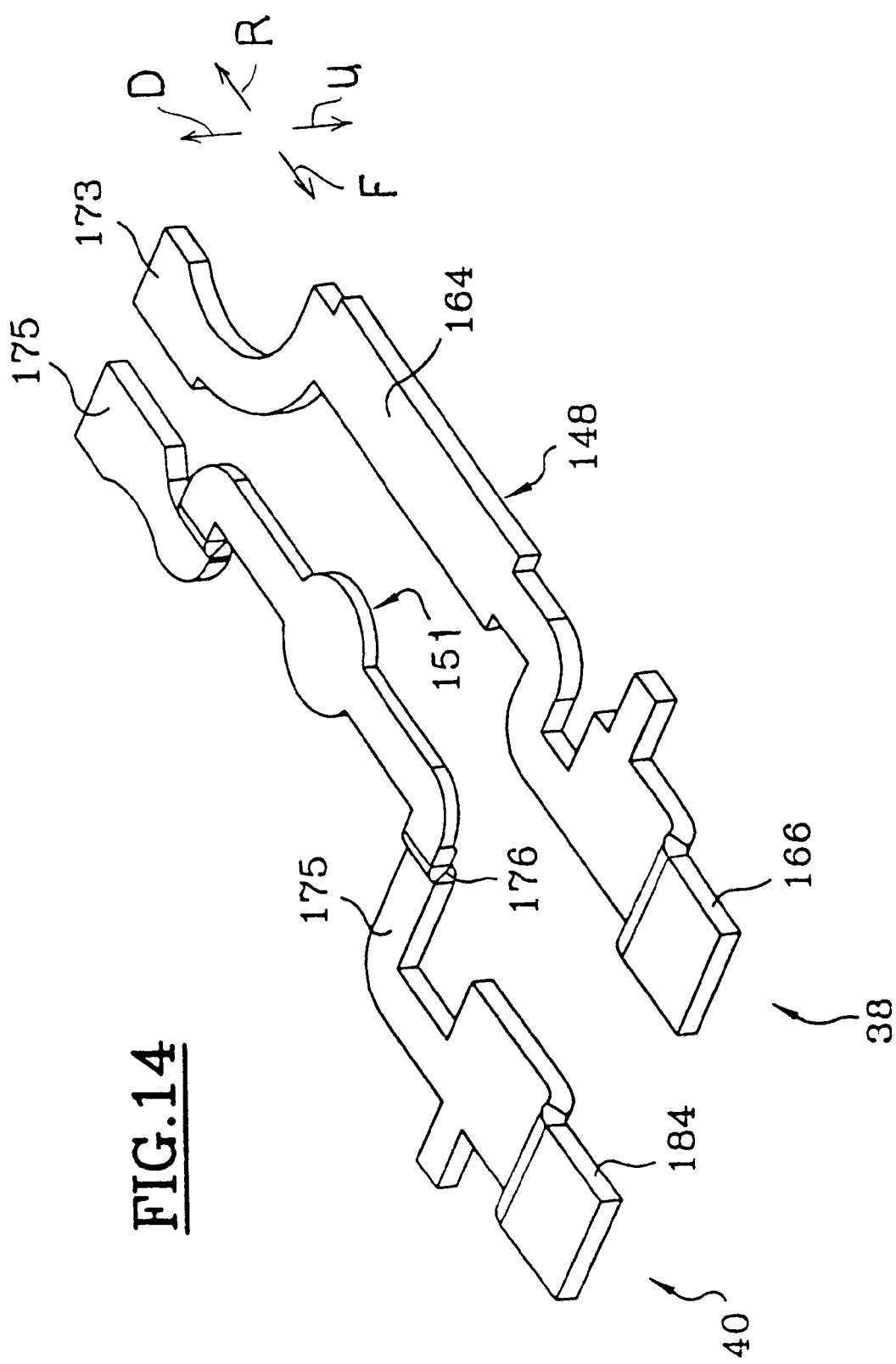
FIG. 14 is an isometric front and bottom view of the contacts of FIG. 13.

FIG. 11 shows the switch unit 34 with an upwardly-opening cavity 114, with the dome-engaging parts 148, 151 of the contacts 38, 40 lying in the cavity. The cavity has front and rear edges 119, 118 and opposite sides 120 that form a largely rectangular cavity. The molded support 100 has an upper face with walls that surround the cavity, including opposite strip-shaped walls 128. A horizontal bottom wall 116 of the cavity supports the dome-engaging parts 148, 151 of the contacts.

FIG. 15 is a sectional view of the entire switch assembly, including the switch unit 34 with its tripping dome 36, the film 126 that lies over the tripping dome, and the actuator 42. It can be seen that a major portion of the actuator, including the second part 82 that has a downwardly-facing convex actuating part 84, lies between the cover 32 and the support 100 of the switch unit 34. The cover upper face 44 extends along the forward portion of the cover, the cover also having a lower rear face portion 46. A lower rear face 46 if provided to allow the passage of embossed features or other protuberances at the lower face of the card. The frontmost eight millimeters of the card are not embossed so the card can ride along the face 44 or very close to it in order to depress the switch lever 88 and abut the stop surface 48 on an upstanding wall 50 of the cover.

Figure 5:
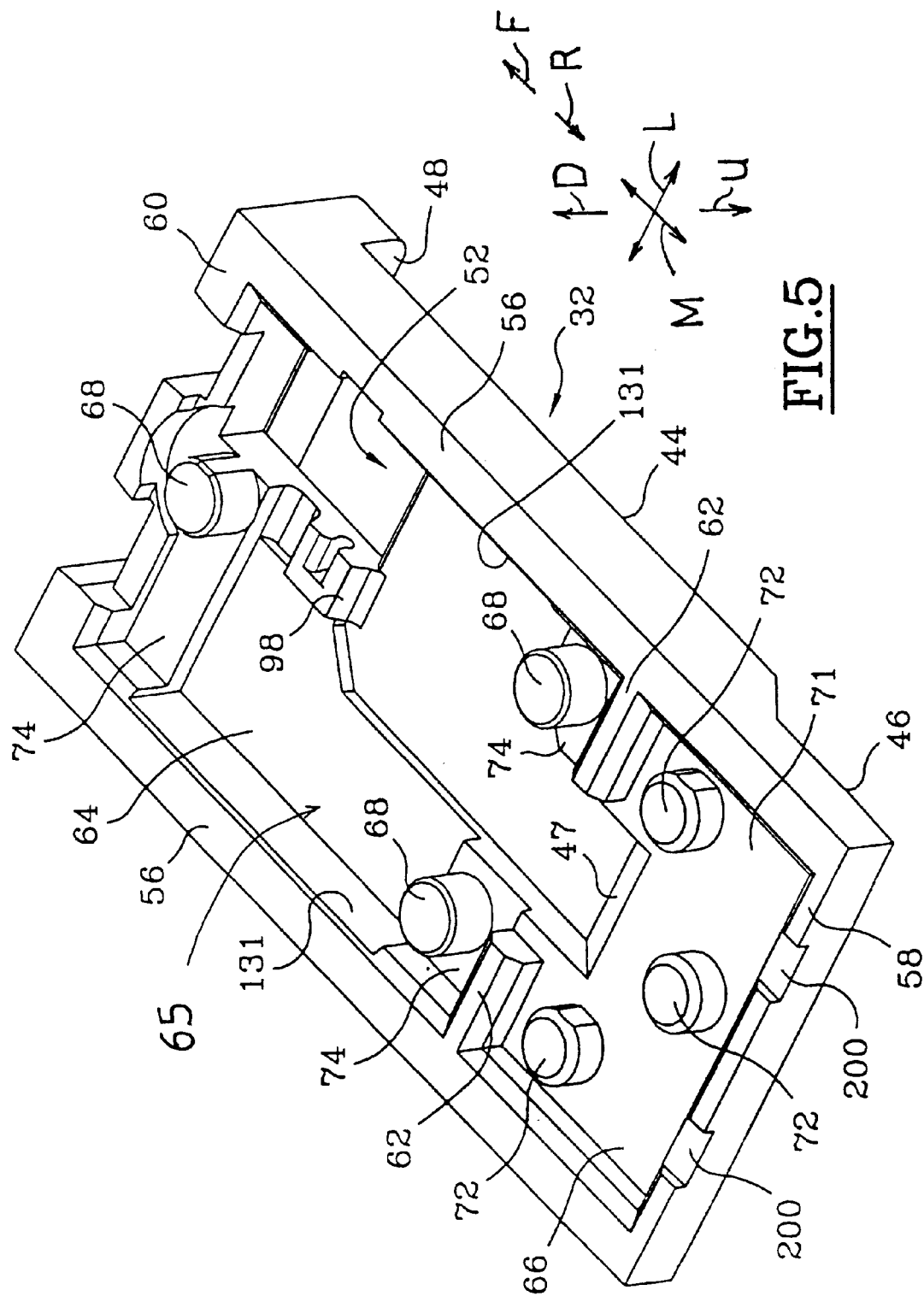
FIG. 5 is an isometric rear and bottom view of the cover of FIG. 4.

The cover 32 has a largely rectangular opening 52 which opens into the cover cavity 65 at the bottom of the cover. FIG. 5 shows that the downwardly-opening cavity 65 in the cover has forward and rearward cavity parts 64, 66. The cover has two longitudinal edges 56 that extend in longitudinal directions M, and has front and rear transverse edges 60, 58 that extend in lateral directions L. The cavity front part 64 extends between the rear transverse edge 60 and an interrupt intermediate rib 62, while the cavity rear part is of smaller longitudinal length and extends between the rib 62 and the rear edge 58. The switch unit fits into the front cavity part 64, while the heel of the actuating device fits into the front cavity portion 66.

Figure 2:
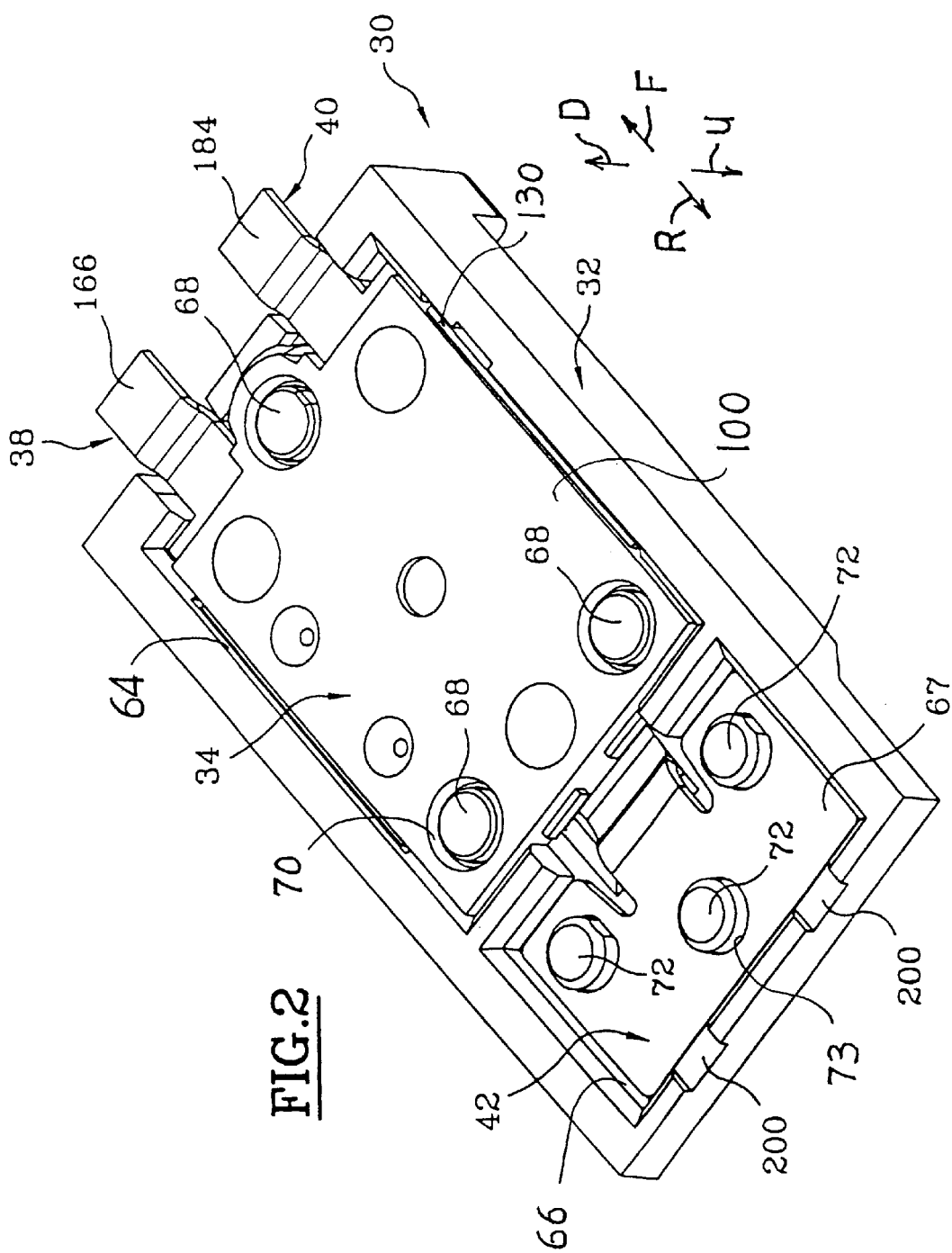
FIG. 2 is an isometric rear and bottom view of the switch assembly of FIG. 1.

FIG. 2 shows the switch unit 34 installed in the cavity front part 64 and the heel 67 of the actuating device installed in the cavity rear part 66. The switch unit 34 is fastened to the cover by three studs 68 of the cover that extend downwardly D into the cavity. The studs are arranged in a triangle and pass through three complimentary holes 70 formed in the body or support 100 of the switch unit. The free ends of the studs are hot crimped in position, or upset, as shown in FIGS. 15 and 17. In a similar manner, three studs 72 extend downward from the bottom of the front cavity through three complimentary holes 73 in the heel 67 of the actuating device to fix it in place.

FIG. 5 shows that the cover has bearing surfaces 74 that support the top of the switch unit support, which is pressed against the surfaces when the studs 68 are crimped. Similarly, the cavity rear part has a bottom wall 71 that supports the heel of the actuating device when the studs 72 are crimped in place over the heel. FIG. 15 shows the upper face 69 of the heel 67 pressed up against the bottom wall 71 of the cavity front part 66. The actuator 42 is fixed in the rear cavity part 66 of the cover before the switch unit 34 is fixed in the front cavity part.

Figure 6:
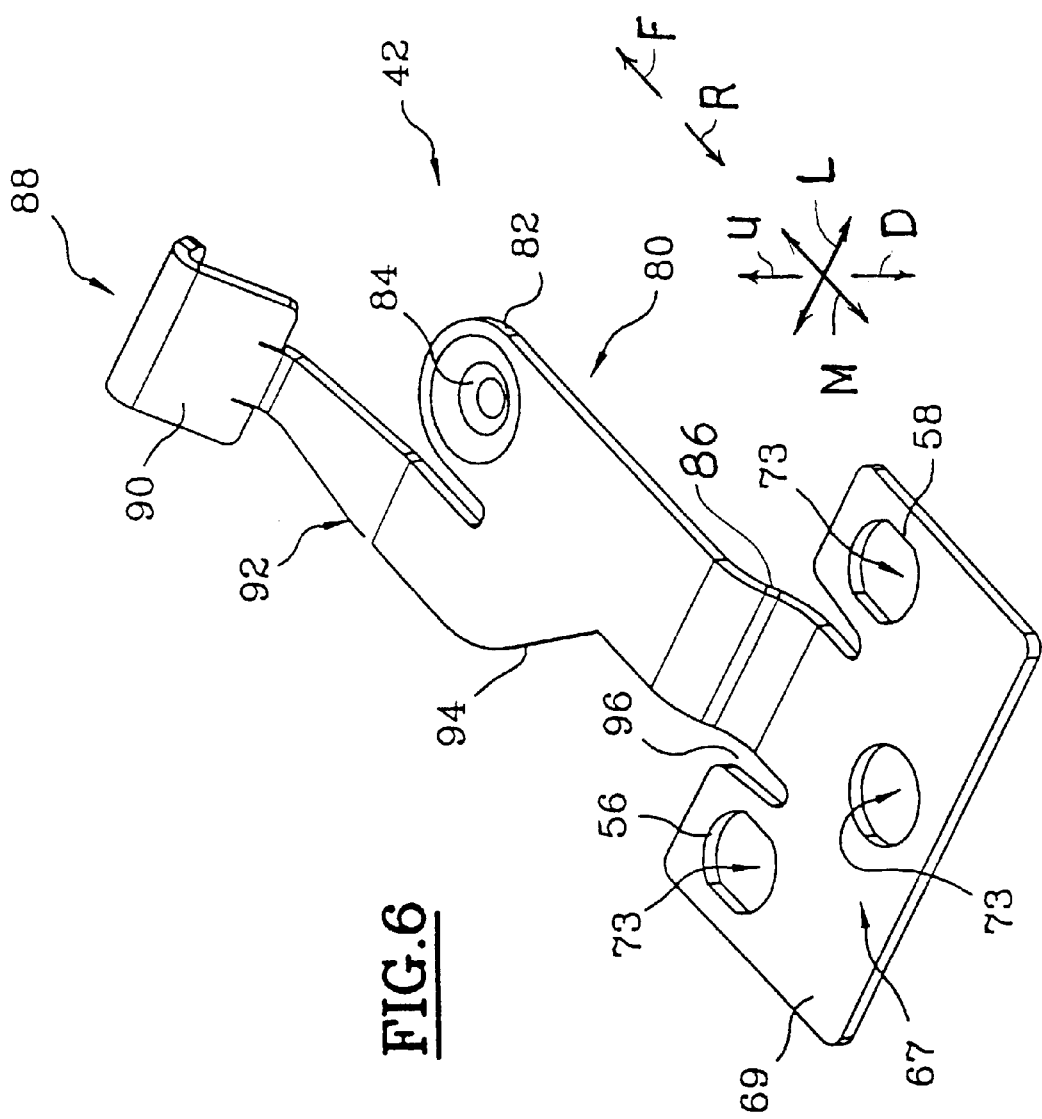
FIG. 6 is an isometric rear and top view of the actuating device of the switch assembly of FIG. 1.
Figure 7:
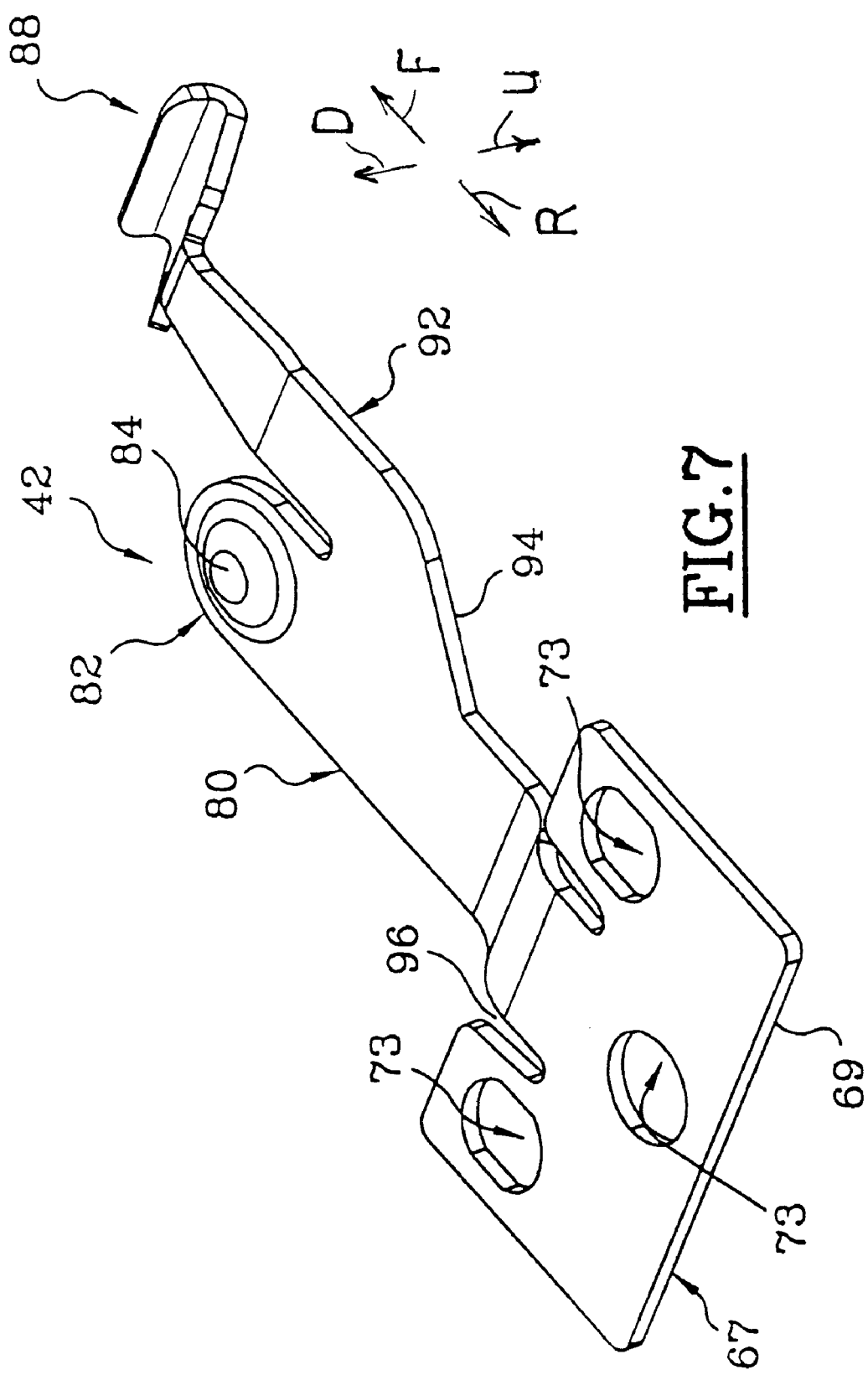
FIG. 7 is an isometric rear and bottom view of the actuating device of FIG. 6.

The actuator 42, which is shown in detail in FIGS. 6 and 7, is of a design that is generally known, except for the heel 67. The heel 67 makes is possible to reduce the height of the switch and makes it easier to produce. The actuator is constructed by stamping a piece of sheet metal from a larger sheet and bending it to the shape illustrated. Forward of the heel 67, the actuator has a control blade 80 which extends in a plane parallel to that of the heel, but which is vertically offset to lie above the plane of the heel. This is accomplished by an s-shaped bend at 86 which lies close to a chaffer 45 (FIG. 17) in the cover. The actuator has a center portion or second part 82 (FIG. 6) which forms a free end and that has a downwardly-facing convex actuating part 84. When the actuating lever 88 is downwardly depressed, it causes the entire control blade to move downward and causes the second part 82 to move downward and depress the tripping dome that closes the switch. The fixing of the actuator heel 67 in the cover, by the studs 72 of FIG. 2 which are hot crimped, is the equivalent of the heel being embedded in the molded plastic of the cover. The rest of the length of the actuator is free to deflect. FIG. 6 shows a pair of slots 96 formed in the heel 67 in the region of the bend or root 86, which increases the resilient bending length of the actuator without increasing its total length. It is noted that two of the holes 73 have longitudinal flats which are complimentary to the flats on the studs 72 (FIG. 5) and allow for some tolerances in the longitudinal positioning of the studs with respect to the holes in the heel.

Figure 10:
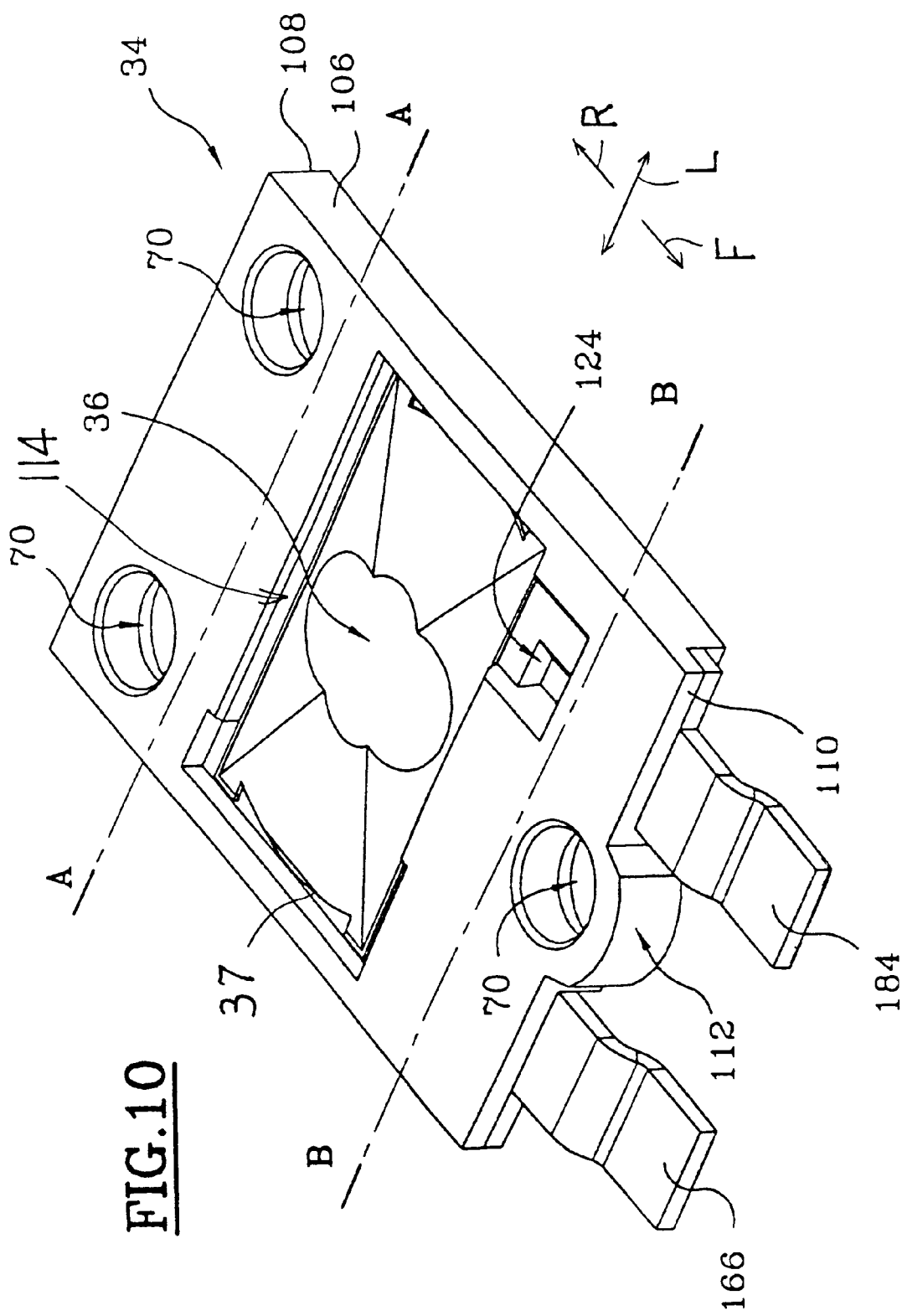
FIG. 10 is a view similar to that of FIG. 8, in which the film for protection and sealed closure of the support has been removed to show the tripping device.
Figure 16:
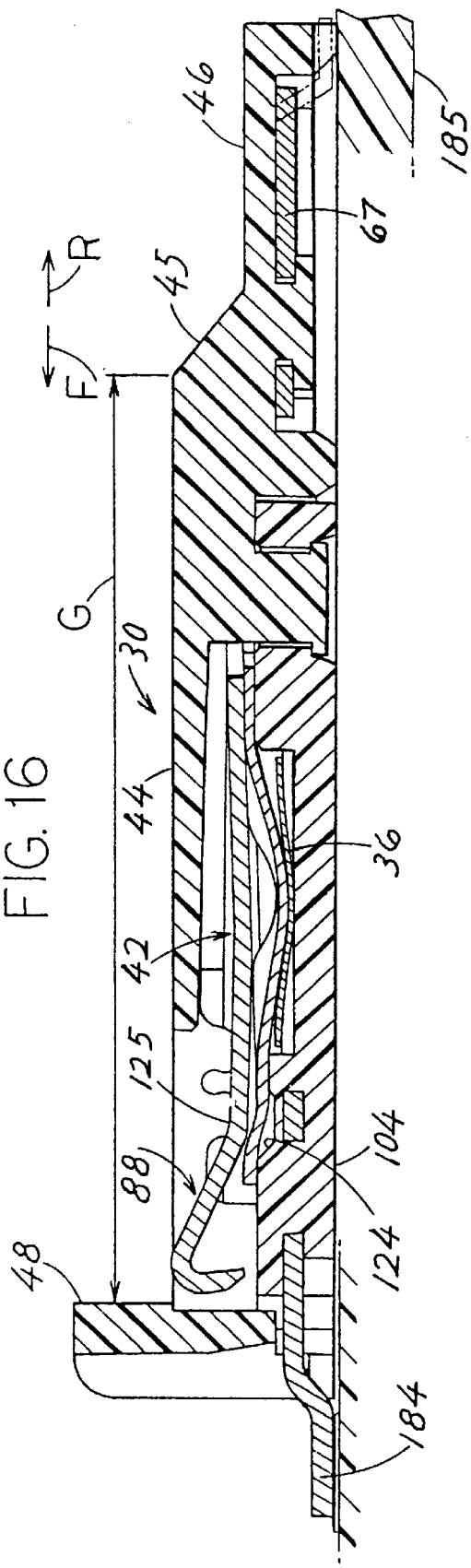
FIG. 16 is a view similar to that of FIG. 15, but with the switch in a tripped position.
Figure 18:
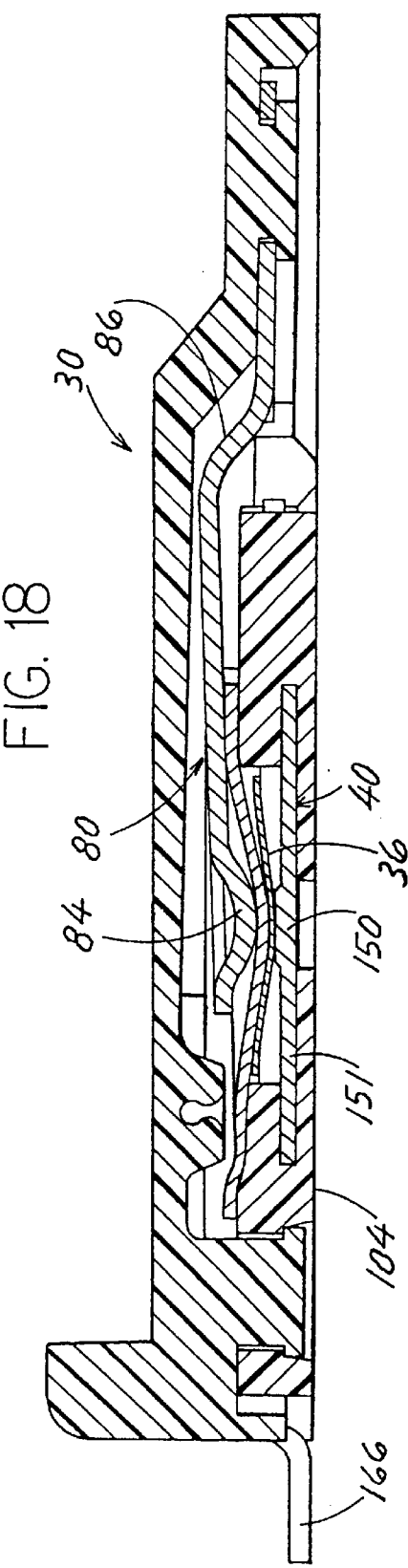
FIG. 18 is a view similar to that of FIG. 17, but with the switch in a tripped position.

FIG. 11 shows that the upwardly-opening cavity 114 in the molded support 100 of the switch unit 34, is of largely rectangular shape, with a greater length in a lateral direction L than in a longitudinal direction M. The tripping dome, which is shown in FIG. 10, has a largely rectangular periphery 37 and fits closely within the cavity 114 to prevent horizontal (lateral and longitudinal) movement of the tripping dome. The tripping dome is in the shape of a truncated pyramid, with four sides merging at a center. FIG. 11 shows that, slightly forward of the front edge of the upwardly-opening cavity 114, the molded support 100 has a small recess 124 which is open in an upward direction. The purpose of the recess is to receive part of the lever of the actuating device, when the lever is depressed by a card. FIG. 16 shows how a part 125 of the pedal can be received in the recess 124.

Figure 8:
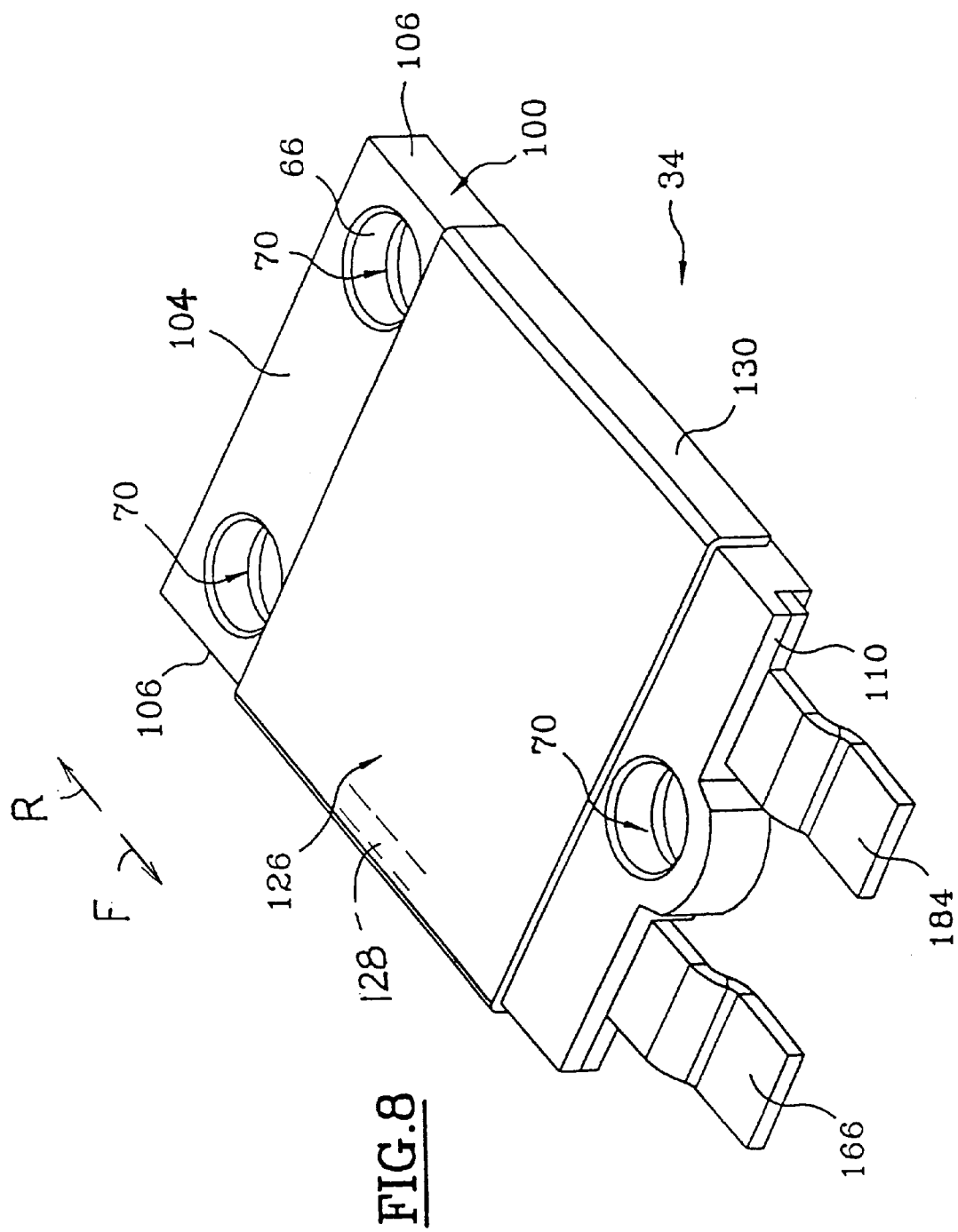
FIG. 8 is an isometric front and top view of the switch unit of the switch assembly of FIG. 3.
Figure 9:
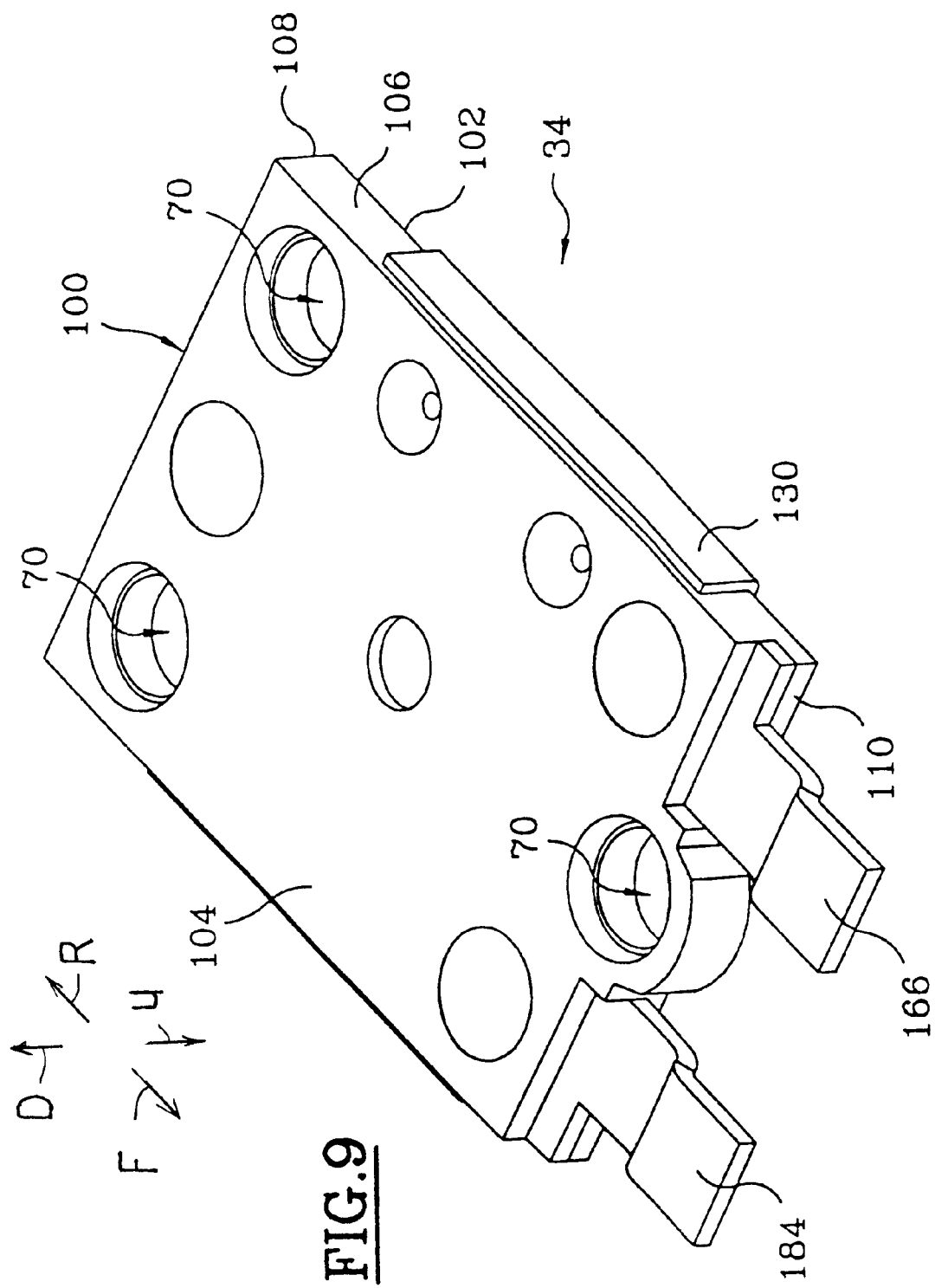
FIG. 9 is an isometric bottom and front view of the switch unit of FIG. 8.

The blind cavities 114, 124 (FIG. 11) in the molded support 100 of the switch unit, receive the active parts of the switch unit, that is, the dome-engaging parts 148, 151 of the contacts and a part of the actuator. These active parts are arranged between lines A—A and B—B. The through holes 70 are arranged outside the central region that lies between the lines A—A and B—B. The regions outside the lines A—A and B—B provide surfaces for the switch unit 34 to bear against the bearing surfaces 74 (FIG. 5) at the top of the cover cavity 65. Since the film that covers the upwardly-opening cavity in the switch unit molded support 100 does not bear firmly against the cover, thickness tolerances in the film do not affect precision of assembly of the parts, during assembly or in use in humid conditions that may swell a film. However, the film shown at 126 in FIG. 8 seals the active regions where contact is made and broken between the tripping dome and the dome-engaging part of the center contact. The film 126 is preferably coated with adhesive on its lower surface so it can be simply pressed into place on the upper surface 104 of the support. Given the small width of lateral strip portions 128 of the upper face of the support, it is advantageous to fold over a portion 130 of the film against the edges 106 of the support. This also avoids the need to precisely cut and position the film. The reliability of the sealing is confirmed by the folded-over side parts 130 being mechanically clamped (FIG. 2) against the edges 106 when the switching unit lies in the cover.

FIG. 15 shows how the studs 68, 72 are hot crimped or hot riveted in place. Such hot riveting assures secure and tight holding of the switch unit support 100 and the heel 67, in a switch assembly of very small height. The total thickness of the switch assembly 30 is determined primarily by the total thickness of the switch unit 34, which results from the sum of the thicknesses of the tripping device 36, the contacts, and the thickness of the support 100 under the contacts. The thicknesses of these elements have been reduced to a minimum. In a switch assembly of the construction illustrated in FIGS. 1–18, the tripping device 36 had a small total rest thickness or height between the center and periphery of the tripping device, of 0.2 mm. The contacts 38, 40 were formed of sheet metal strip, that each had a thickness 0.17 mm. The contacts have connection ends 166, 184 that are soldered by a buyer of the switch assembly or switch unit, to a printed circuit board 185, to which a connector that may incorporate the switch, is also fixed. The connection ends such as 184, are offset from intermediate portions such as 167 of the contacts by an amount H that is no more that 1.5 times the thickness of the contacts, which results in a switch unit of minimum height and minimum tolerance build-up due to bends and flexing at the bends.

The design of the outer and center contacts 38, 40 not only minimizes the height of the switch unit, but also enables very precise manufacture by minimizing the build-up of manufacturing tolerances, especially those resulting from bending. FIG. 13 shows that the outer contact 38 is in the form of a strip with upper and lower faces 162, 164 that are parallel and flat. The strip 38 is flat (unbent) along almost the entire length of the strip, with only the free connection end 166 being bent out of the plane of the rest of the strip. The bending of the connection end 166 is done after overmolding of the molded support 100 around an intermediate portion 167 of the contact, as well as around a rear portion 165 of the contact. Since the connection end 166 is not bent or supported during molding, only the rest of the flat planar contact affects the precision of its positioning, with a flat contact being easily precisely located. The outer contact has a rounded shape at 168 which is formed by stamping at the time of cutting the outer contact strip 38 from a sheet, in order to improve the quality of the line of contact between the largely dome-shaped tripping device and the dome-engaging part 148 of the contact. As a result, about the only manufacturing tolerance involved in the construction of the outer contact 38 (prior to bending its connect end 166) is the thickness of the metal from which the outer contact is cut. This thickness can be held to a tolerance of less than 0.001 inch for a contact having a thickness of 0.17 mm.

The central contact 40 is also of strip shape, with intermediate and rear portions 172, 170 molded into the molded support 100. The upper and lower faces of the portions 170, 172 are coplanar with each other, and with the upper and lower faces 162, 164 of the outer contact. The two strips 38, 40 are preferably cut from the same piece of sheet metal, so their thicknesses are the same, that is, with a tolerance of no more than ten microns. The center contact 40 has bends at 176 resulting in a downward offset of the contact middle part 151, that includes a center part 150, between the intermediate and rear portions 172, 170. The offsetting increases the allowable deflection of the tripping device or tripping dome 156 to assure that the switch is not closed when a card is not in place.

In order to assure that electrical contact is established between the tripping dome and the central part 150 of the dome-engaging portion 151 of the center contact, the central part 150 is raised above the surrounding region 182. The regions 182 are flattened, with the thickness of the central part 150 being the original thickness of the contact, so this thickness is the same (within a few microns) as that of the outer contact when they are cut from the same piece of sheet metal. FIG. 13A (which is upside-down) shows that the central part 150 of the center contact has its face located a distance E below the face 148 of the outer contact, with the thickness at 150 being the same as the thickness of the outer contact 38.

Referring to FIG. 16, only a limited distance G is available for the upper face 44 and the actuator title 88, the distance G being 8 millimeters, so that card embossing can be present on a smart card more than 8 millimeters from its front edge. To more completely utilize this space, applicant has oriented the tripping dome 36 shown in FIG. 10, so its long dimension extends laterally L.

The rear portion of the cover (FIG. 15), whose rear face 46 is lower than the upper face 44, is a place where the heel 67 of the actuator lies, the heel being thin and therefore able to be accommodated in a cover portion of small thickness.

In a switch assembly of the construction illustrated in FIGS. 1–18 that applicant has designed, the dome had a total thickness when uncompressed, of about 0.2 mm. The strip contacts 38, 40 were each formed of sheet metal of a thickness of 0.17 mm. The offset in height E (FIG. 13A) between the dome-engaging parts of the two contacts was 0.11 mm (less than the sheet metal thickness), and the minimum thickness of the insulating plastic 149 (FIG. 17) that was overmolded around the contacts and lay below the contacts, was 0.13 mm. The total height of the switch unit 34 in its rest state, between the lower face 103 and upper face 104 of the support 100 was 0.6 mm. The small total thickness of the switch unit 34, makes it possible to produce connectors of small thickness that incorporate such a switch. The total thickness of the switch assembly, including the cover, up to the upstanding wall 50, and except for the protruding portion of the actuating lever, can be as little as about 1 mm. In the design illustrated, the thickness of the switch assembly between the lower and upper faces 103, 104 of the switch unit and of the cover, is 1.25 mm. The thickness can be reduced even further if the cover does not have a wall over the actuator second portion 82.

FIGS. 19 and 20 illustrate another switch assembly 30A with outer and center contacts 38A, 40A of different design. That is, the connecting ends 166', 184' of the contacts are spread apart at the same distance as in FIGS. 1–18, but more forward portions of the contacts are bent to lie closer together.

FIGS. 21 and 22 show another switch assembly 30B where the switch is normally closed, and is opened when the ramp 90B of a rocker 200 is depressed to upwardly deflect an actuator part 92.

Figure 23:
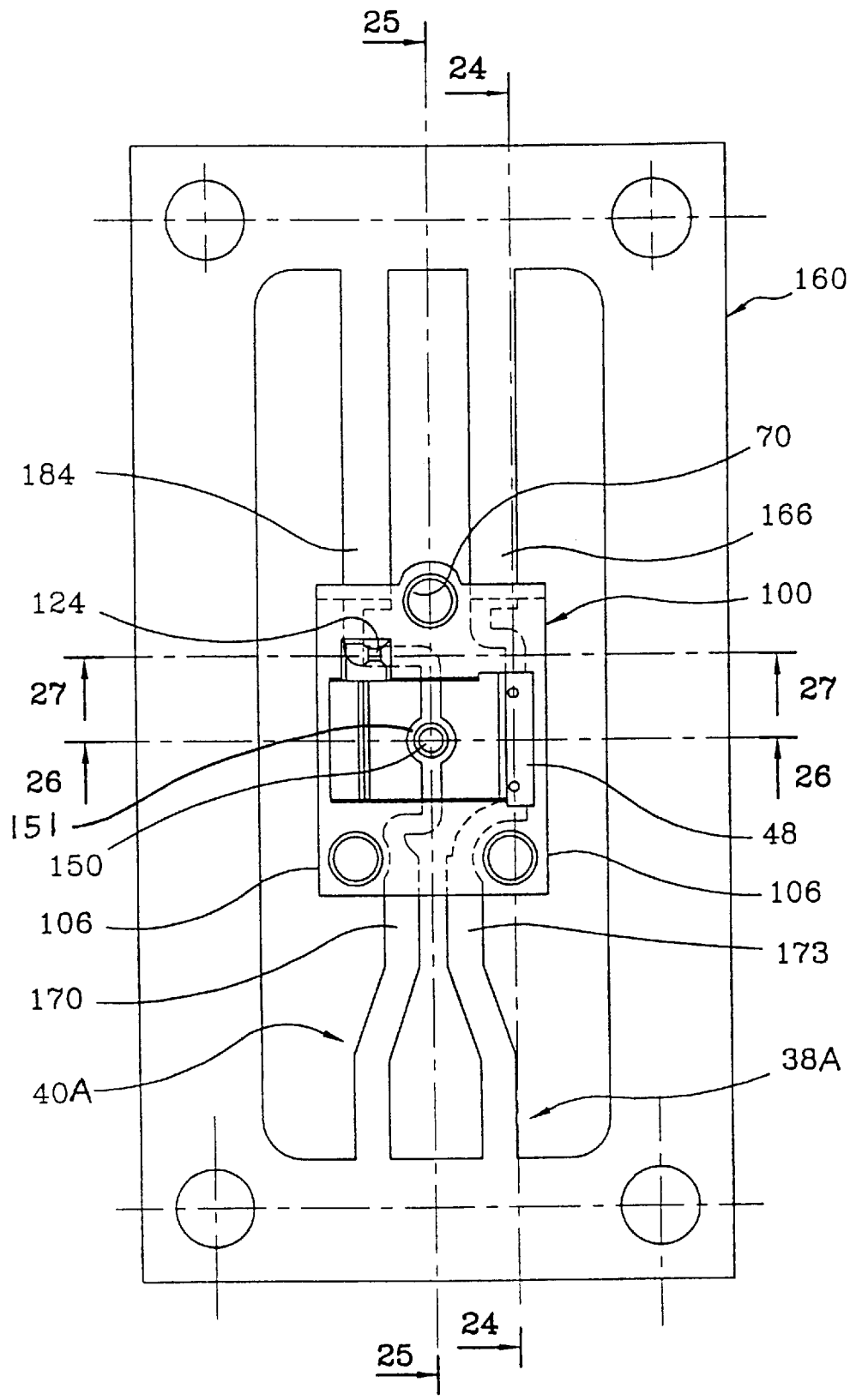
FIG. 23 is a top view of the switch of FIG. 19, illustrating the overmolding of the support of the switch unit about its fixed contacts.

FIG. 23 shows, in hidden lines, how the contacts 38A, 40A of FIGS. 19 and 20 are bent to result in the dome-engaging parts 148, 150 of the contacts lying in the same positions as in FIGS. 1–18. FIGS. 24–27 show different parts of the contacts 38A and 40A.

FIGS. 28–31 show how the switch unit 34 (FIG. 30) can be mounted in a connector 300 that has contact blades 304 for engaging contact pads of a smart card. The connector portion having the contact blades can be made thin because no separate tripping dome and separate contacts must lie below the card-engaging portions of the blades. A very thin switch unit can match the thin portion of the connector that holds the contact blades.

FIG. 29 shows that a card inserted in a forward direction will engage the actuator lever 88 near the extreme forward end of its travel. FIG. 30 shows that the connection ends 166, 184 of the contacts can lie in a lateral (L) line with connection ends 302 of contact blades at the rear end of the connector. The heel 67 of the actuator is shown as including a heel connection end 306, which is in line with the connection ends 32 of the front row of contact blades. The connection ends 166, 184 and 306 may be placed at the same spacing as the spacing between the connection ends 302 of the contact blades.

In general, the smart card has eight standardized contact areas, with one contact area being located so a contact blade 304 of the connector cannot engage it. The "free" area or contact pad of the smart card may be electrically connected to a track on a circuit board through the actuator device, by engaging the actuator pedal or lever 88 of the actuator. Current can flow through the actuator to its connection end or tab 306, and to a trace on the circuit board.

While terms such as "top", "bottom", etc. have been used to describe the invention as illustrated, the switch assembly and switch unit can be used in any orientation with respect to the Earth.

Thus, the invention provides a switch assembly for detecting full insertion of a smart card, which is of very small height, and which enables its parts to be installed with high precision. The assembly includes a switch unit with an insulative molded support having an upwardly-opening support cavity, a pair of contacts mounted in the support and having dome-engaging parts, and a tripping dome lying in the cavity. A cover has a downwardly-opening cavity, with the switch unit lying in a front portion of the cavity. An actuating device which lies between the switching unit and the top of the cover, to depress the tripping dome when a card is detected, has a heel that is fixed in the rear portion of the cover cavity. The tripping dome is in the form of a truncated pyramid having an elongated rectangular periphery lying closely within the upwardly-opening cavity in the switch unit support. The cavity is elongated in a lateral direction, as is the tripping dome. The contacts of the switching unit include outer and central contacts in the form of strips cut from the same piece of sheet metal and having intermediate and forward ends that lie in the same plane. However, a dome-engaging portion of the central contact is depressed by downwardly bending opposite ends of the dome-engaging portion.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A switch assembly for detecting full insertion of a smart card into a read/write apparatus, comprising:

a molded support of insulative material having front and rear ends, said support forming an upwardly-opening support cavity;

outer and central contacts mounted on said support and having dome-engaging parts lying in said support cavity;

a tripping dome having a periphery lying on the dome-engaging part of said outer contact and having a center portion lying over the dome-engaging part of said central contact;

an actuator for depressing said center portion of said tripping dome;

a cover having front and rear ends, said cover having a card-adjacent upper face and a downwardly-opening cover cavity with front and rear cavity portions, with said support received in said cover cavity;

said actuator comprising a piece of resilient sheet metal having a second part substantially engaged with said center portion of said tripping dome, and having an actuating lever extending above said cover upper face with said lever merging with said second part to depress said second part when said lever is depressed;

said actuator having a heel that merges with said second part and that lies in said cavity rear part and that is fixed with respect to said cover.

2. The switch assembly described in claim 1 wherein:

said outer and central contacts have intermediate portions lying in a common plane and extending from said dome-engaging parts and embedded in said molded support, and said contacts have connection ends that project from said intermediate portions for connection to traces on a circuit board, said connection ends lying in a plane that is parallel to the plane of said intermediate portions, but that is bent to be offset therefrom by no more than the 1.5 times thickness of said sheet metal at said intermediate portion, whereby to minimize tolerances resulting from bends.

3. The switch assembly described in claim 1 wherein:

said tripping dome is in the form of a truncated pyramid having a rectangular perimeter, and having a tripping dome middle, with said rectangle being longer in a lateral direction that is perpendicular to front and rear directions than along said front and rear directions.

4. The switch assembly described in claim 1 wherein:

said support has a support part lying under said actuating lever, with said support part having a cavity (124) that is positioned to receive a part of said actuating lever when said actuating lever is depressed.

5. The switch assembly described in claim 1 wherein:

said support has surrounding walls that completely surrounding said cavity, and including a film lying over said cavity and sealed to said surrounding walls, with said film having a middle that is sandwiched between said center portion of said actuating device and said center portion of said tripping device to transmit forces between them.

6. The switch assembly described in claim 1 wherein:

said cover cavity opens downwardly, and said cover has an upper wall lying over said cavity portions and has a plurality of studs extending down from said upper wall into each of said cavity portions, with said studs integrally molded into said cover;

said support lies in said front cavity portion and has a plurality of holes, and said heel of said actuating device lies in said rear cavity portion and has a plurality of holes;

said studs project closely through said holes in said support and in said heel, with said studs having upset lower ends to fix said support and said heel in said cavity portions.

7. The switch assembly described in claim 1 wherein:

said actuating lever is designed to engage a conductive contact pad on said smart card;

said cover has front and rear ends, with said lever lying at said front end and said heel lying at said rear end, and said actuating device includes a connection end (306) that extends rearwardly from said heel rear end and which is formed as a terminal for electrical connection to a circuit board.

8. The switch assembly described in claim 1 wherein:

said tripping dome has a periphery lying on said outer contact to electrically connect thereto;

said outer and central contacts have connection ends that project from said support and have intermediate parts that are molded into said supports with said outer and central contacts being in the form of strips with upper faces that are coplanar at least at said intermediate portions, with said central contact having a middle that is bent downward to lie below said upper faces of said intermediate portions, to avoid inadvertent engagement with said tripping dome when said lever is not depressed by a card.

9. The switch assembly described in claim 1 wherein:

said heel is wider than said second part, and said heel has a pair of slots that form an extension of said second part into said heel.

10. A switch assembly for detecting full insertion of a smart card into a read/write apparatus, comprising:

a molded support of insulative material said support forming an upwardly-opening support cavity, and said support having a flat top wall surrounding said support cavity and said support having vertical edges;

outer and central contacts mounted on said support and having dome engaging parts lying in said support cavity;

a tripping dome having a periphery lying on the device engaging part of said outer contact and having a center portion lying over the device engaging part of said central contact;

an actuator for depressing said center portion of said tripping dome;

a film which lies over said cavity and that is sandwiched between said actuator and said center portion of said tripping dome, said film lying on and sealed to said support top wall, and said film being wrapped to lie on said vertical edges.

11. The switch assembly described in claim 10 wherein:

said support cavity is of largely rectangular shape and said tripping dome is in the form of a truncated pyramid with a rectangular periphery lying closely within said cavity of largely rectangular shape to prevent horizontal movement of said tripping dome, and with a truncated upper end of said pyramid forming said center portion that lies over said device engaging part of said central contact.

12. The switch assembly described in claim 10 wherein:

said actuator is elongated in a longitudinal direction (M), and said support cavity and said tripping dome are elongated in a lateral direction (L) that is perpendicular to said longitudinal direction.

13. A switch assembly for use in detecting full insertion of a smart card into a read/write apparatus, comprising:

a molded support of insulative material said support forming an upwardly-opening support cavity;

outer and central contacts mounted on said support and having dome engaging parts lying in said support cavity;

a tripping dome having a periphery lying on the dome-engaging part of said outer contact and having a center portion lying over the device engaging part of said central contact;

said outer and central contacts are in the form of strips with intermediate portions fixed to said support with said intermediate portions having faces that are coplanar, with said dome-engaging part of said central contact being bent downward to lie below said faces of said intermediate strip portions.

14. The switch assembly described in claim 13 wherein:

said outer and central contacts are formed from the same larger piece of sheet metal, to assure precisely identical initial thicknesses with a difference of no more than ten microns;

said dome-engaging part of said central contact has a raised region lying directly under said center portion of said dome and has a depressed area beside said region, with said depressed area having an upper face lying at a lower level than said raised region, with said depressed area being of smaller thickness than said raised region and said raised region being of precisely the same thickness as the thickness of said dome-engaging part of said outer contact.

15. The switch assembly described in claim 13 wherein:

said outer and central contacts are cut from the same larger piece of sheet metal, to assure substantially identical thicknesses;

said outer and central contacts have rear and intermediate portions embedded into said support, with said rear and intermediate portions of both contacts and the dome-engaging portion of said outer contact being coplanar.

* * * * *